(12) United States Patent
Kohara et al.

(10) Patent No.: US 8,337,791 B2
(45) Date of Patent: Dec. 25, 2012

(54) EXHAUST GAS PURIFICATION CATALYST, EXHAUST GAS PURIFICATION APPARATUS USING THE SAME AND EXHAUST GAS PURIFICATION METHOD

(75) Inventors: Akira Kohara, Osaka (JP); Yoshiro Hirasawa, Numazu (JP); Takashi Yamada, Numazu (JP)

(73) Assignees: Daiichi Kigenso Kagaku Kogyo Co., Ltd., Osaka-shi, Osaka (JP); N.E. Chemcat Corporation, Tokyo (JP)

( * ) Notice: Subject to any disclaimer, the term of this patent is extended or adjusted under 35 U.S.C. 154(b) by 211 days.

(21) Appl. No.: 13/002,732

(22) PCT Filed: Oct. 19, 2009

(86) PCT No.: PCT/JP2009/067982
§ 371 (c)(1),
(2), (4) Date: Jan. 5, 2011

(87) PCT Pub. No.: WO2010/064497
PCT Pub. Date: Jun. 10, 2010

(65) Prior Publication Data
US 2011/0113754 A1 May 19, 2011

(30) Foreign Application Priority Data

Dec. 3, 2008 (JP) ................. 2008-308532
Feb. 13, 2009 (JP) ................. 2009-031294

(51) Int. Cl.
*B01D 53/94* (2006.01)
*B01J 23/56* (2006.01)
*B01J 35/00* (2006.01)
*F01N 3/10* (2006.01)

(52) U.S. Cl. ............... 423/213.2; 423/213.5; 423/213.7; 502/304; 502/325; 502/349; 502/527.12; 60/299

(58) Field of Classification Search ........... 502/304, 502/325, 349, 527.12; 423/213.2, 213.5, 423/213.7; 60/299
See application file for complete search history.

(56) References Cited

U.S. PATENT DOCUMENTS

| | | | |
|---|---|---|---|
| 8,202,819 B2 * | 6/2012 | Kohara et al. ......... | 502/304 |
| 2001/0022956 A1 | 9/2001 | Okamoto et al. | |
| 2002/0141908 A1 | 10/2002 | Miyoshi et al. | |
| 2007/0155624 A1 | 7/2007 | Wakita et al. | |
| 2008/0066458 A1 | 3/2008 | Toyoda et al. | |
| 2008/0182746 A1 | 7/2008 | Matsueda et al. | |
| 2010/0061903 A1 * | 3/2010 | Kohara et al. ......... | 423/213.2 |
| 2011/0274603 A1 * | 11/2011 | Kohara et al. ......... | 423/213.5 |

FOREIGN PATENT DOCUMENTS

| | | |
|---|---|---|
| JP | 3-106446 A | 5/1991 |
| JP | 5-237390 A | 9/1993 |
| JP | 6-075675 B2 | 9/1994 |
| JP | 2001-310131 A | 11/2001 |
| JP | 2002-326033 A | 11/2002 |
| JP | 2006-159159 A | 6/2006 |
| JP | 2007-167780 A | 7/2007 |
| JP | 2007-319768 A | 12/2007 |
| JP | 2008-068225 A | 3/2008 |
| WO | 00/27508 A1 | 5/2000 |
| WO | 2006/030763 A1 | 3/2006 |
| WO | 2008/093471 A1 | 8/2008 |

OTHER PUBLICATIONS

International Search Report of PCT/JP2009/067982, mailing date Jan. 26, 2010.

* cited by examiner

*Primary Examiner* — Timothy Vanoy

(74) *Attorney, Agent, or Firm* — Westerman, Hattori, Daniels & Adrian, LLP

(57) ABSTRACT

An exhaust gas purification catalyst, which is suitable as a three way catalyst for efficiently purifying carbon monoxide (CO), hydrocarbons (HC), and nitrogen oxides (NOx) in exhaust gas discharged from a gasoline automobile and exhaust gas purification apparatus using the same and an exhaust gas purification method. <The upper layer> A catalyst composition having an activated metal (A), a heat resistant inorganic oxide (B) and a cerium-zirconium-type composite oxide (C) containing a pyrochlore phase in a crystal structure, wherein the activated metal (A) is rhodium. <The lower layer> A catalyst composition having an activated metal (A), a heat resistant inorganic oxide (B) and a cerium-containing oxide (C') having a cubic crystal and/or tetragonal crystal structure as a major crystal structure, wherein the activated metal (A) is palladium, or palladium and platinum.

16 Claims, 8 Drawing Sheets

EXHAUST GAS PURIFICATION CATALYST, EXHAUST GAS PURIFICATION APPARATUS USING THE SAME AND EXHAUST GAS PURIFICATION METHOD

BACKGROUND OF THE INVENTION

1. Field of the Invention

The present invention relates to an exhaust gas purification catalyst, an exhaust gas purification apparatus using the same and an exhaust gas purification method, and in more detail, the present invention relates to an exhaust gas purification catalyst, which is suitable as a Three Way Catalyst for efficiently purifying carbon monoxide (CO), hydrocarbons (HC) and nitrogen oxides ($NO_x$) contained in exhaust gas discharged from a gasoline automobile, an exhaust gas purification apparatus using the same and an exhaust gas purification method.

2. Description of the Prior Art

Exhaust gas discharged from an internal combustion engine of an automobile or the like, or a combustion engine such as a boiler, contains harmful substances such as hydrocarbons (HC), carbon monoxide (CO), nitrogen oxides ($NO_x$), and various exhaust gas purification technologies for purifying these have been proposed. As one of these, there is an exhaust gas purification technology for purifying harmful components in exhaust gas, by installment of a catalyst in an exhaust gas passage.

In a catalyst apparatus for purifying exhaust gas discharged from an internal combustion engine of an automobile or the like, various catalysts have been used depending on objects thereof. As a major catalyst component thereof, there is a platinum-group metal, and usually it is supported onto a refractory inorganic oxide with large surface area such as activated alumina, in a highly dispersed state (refer to Patent Literature 1).

As for the platinum-group metal, which is the catalyst component, platinum (Pt), palladium (Pd) and rhodium (Rh) have been known, which have been widely used as the exhaust gas purification catalyst in an internal combustion engine such as an automobile. In many cases, in the above-described Three Way Catalyst (TWC: Three Way Catalyst), a catalytically activated species superior in oxidation activity, such as Pt and Pd, and Rh, which is superior in purification activity of $NO_x$, are used in combination. In recent years, regulations on harmful substances, in particular $NO_x$, contained in exhaust gas, have been increasingly tightened. Therefore, it is necessary to efficiently use Rh, which is superior in purification activity of $NO_x$, however, because output of Rh is low and Rh price is expensive, market price thereof has been rising. Therefore, it is desired to reduce use amount of Rh, as a catalytically activated species, in view of resource protection or a cost aspect.

In order to reduce use amount of Rh, it is preferable that Rh is formulated more at the front layer side of the catalyst, so that Rh is arranged at a position easy to contact with exhaust gas (refer to Patent Literature 8). In this Patent Literature 8, there has been described an exhaust gas purification catalyst wherein ceria-type solid state oxide powder, which supports Rh, is contained in the upper layer, and at least either of Pt and Pd is supported onto hollow-state oxide powder in the lower layer.

In addition, in order to enhance further purification performance in the exhaust gas purification catalyst, various co-catalyst components other than the platinum-group metal are added. As such co-catalyst components, an oxygen storage component, (OSC: Oxygen Storage Component), an alkaline earth metal, zirconium oxide, zeolite and the like are known.

Among them, the OSC is one which occludes and discharges oxygen in exhaust gas, and cerium oxide is known as an example. Cerium oxide occludes oxygen as $CeO_2$ when oxygen concentration is high in exhaust gas, and discharges oxygen as $Ce_2O_3$ when oxygen concentration is low. Oxygen discharged is active oxygen to promote purification of HC and CO by being utilized in oxidation action by Pt or Pd. In addition, the OSC also acts in buffering the change of oxygen concentration in exhaust gas, by occlusion and discharging of oxygen. This action enhances purification performance of exhaust gas in the TWC.

The TWC is one performing oxidation and reduction by one catalyst, and has a range of exhaust gas components suitable for purification, in view of designing. This range depends on air/fuel ratio in many cases. Such a range is called a window, in many cases, exhaust gas after combustion at the vicinity of theoretical air/fuel ratio is set in the window region. By buffering the change of oxygen concentration in exhaust gas, this window region can be maintained for a long period of time, and purification of exhaust gas is performed efficiently. It is said to give influence on purification performance of $NO_x$, in particular, by Rh.

As such OSC, pure cerium oxide may be enough, however, it is used as a composite oxide with zirconium (refer to Patent Literature 2). The cerium-zirconium composite oxide has high heat resistance and also high oxygen storing speed. It is because the cerium-zirconium composite oxide has a stable crystal structure, does not inhibit the action of cerium oxide, which is a major OSC component, and thus acts as the OSC as far as the inside part of a particle.

In addition, it is desirable generally that such OSC has a high specific surface area value. The high specific surface area value means large active surface and is said that high activity as the OSC is also exhibited.

In purification of $NO_x$ by Rh, a steam reforming reaction is promoted as follows by the Rh component.

$$HC + H_2O \dashrightarrow COx + H_2 \qquad (1)$$

$$H_2 + NOx \dashrightarrow N_2 + H_2O \qquad (2)$$

And, use of a zirconium oxide together with the Rh component promotes the steam reforming reaction (refer to Patent Literature 3).

As the co-catalyst component, other than this, an alkaline earth metal such as a Ba component is known (refer to Patent Literature 4). The Ba component temporarily occludes NO contained in exhaust gas as $Ba(NO_3)_2$, and reduces and purifies NO occluded to $N_2$ by a reducing component contained in exhaust gas.

In general, when fuel to be supplied to an engine is scarce, quantity of air is rich and combustion temperature is high, NO is generated in a large quantity. The Ba component temporarily absorbs $NO_x$ thus generated.

$NO_x$ absorbed by the Ba component is discharged from the Ba component, when $NO_x$ concentration becomes low and CO concentration becomes high in exhaust gas. This is caused by a reaction of the above $Ba(NO_3)_2$ with CO to be converted to $BaCO_3$, and is also said chemical equilibrium. $NO_x$ discharged from the Ba component reacts with the reducing component at the surface of the Rh component as described above, and thus is reduced and purified.

As such a co-catalyst component, two or more can be used in combination, for example, the TWC using the Ba component and cerium oxide is known (refer to Patent Literature 5).

However, purification performance may be lowered depending on combination of catalyst materials, for example, it has been reported that presence of the Rh component and the Ba component in the same composition reduces purification performance of $NO_x$ (refer to Patent Literature 6). The reason for this is not certain, however, it is considered to be caused by interference of purification action of $NO_x$ in the Rh component, because the alkaline earth metal component has occlusion action of $NO_x$, and by making an alloy of the Ba component and the Rh component.

In this way, because there are various combinations of the catalyst components, and the catalyst components mutually take complicated reaction routes by correlated action, combinations of the catalyst components for exerting best purification performance have been searched by investigating these comprehensively.

It should be noted that the exhaust gas purification catalyst is enough to be arrange only one in an exhaust gas passage, however, there may be the case where two or more are arranged. Because catalyst surface area is increased by this, purification performance of exhaust gas enhances. However, as described above, because there is the window region in designing in the exhaust gas purification catalyst such as the TWC, there may be the case where desired purification performance cannot be obtained only by simple arrangement of a plurality of catalysts. It is because components of the exhaust gas, which passed through a catalyst of the former stage, has composition different from that of exhaust gas just after discharged from an engine, and a catalyst of the latter stage is necessary to be designed so as to have the composition of exhaust gas thus changed, as the window region.

Therefore, the present applicant have proposed a method for obtaining desired purification performance by using a catalyst system where two catalysts having a platinum-group metal and a specified oxygen storage component (OSC) as catalyst components are arranged in an exhaust gas passage (refer to Patent Literature 7).

In general, because the exhaust gas purification catalyst enhances purification activity of exhaust gas, when temperature is raised to a certain degree, in the case where an engine is started from a completely cooled state, sufficient purification performance cannot be exerted, in some cases, till the exhaust gas purification catalyst is warmed. In the case of purifying exhaust gas from an automobile by such catalyst technology, such performance has been required that is capable of purifying harmful components in exhaust gas in higher efficiency as compared with conventional technology, in a wider temperature region covering from start-up of an engine in a cooled state to a state where the exhaust gas is warmed and catalyst temperature is raised.

In addition, in recent years, regulation values for, in particular, $NO_x$, have been increasingly tightened, and needs for the exhaust gas purification catalyst superior in purification performance of $NO_x$ has been increasing in the TWC too.

Patent Literature 1: JP-A-5-237390
Patent Literature 2: JP-B-06-75675
Patent Literature 3: JP-A1-2000/027508, page 14
Patent Literature 4: JP-A-2007-319768, paragraph 0003
Patent Literature 5: JP-A-03-106446
Patent Literature 6: JP-A-2002-326033, paragraph 0013
Patent Literature 7: JP-A-2008-68225
Patent Literature 8: JP-A-2006-159159, claim 3

SUMMARY OF THE INVENTION

In view of the above problems, it is an object of the present invention to provide a catalyst exerting excellent purification performance for exhaust gas discharged from an internal combustion engine of an automobile, an exhaust gas purification apparatus using the same and an exhaust gas purification method.

The present inventors have intensively studied a way to attain the above-described object and as a result, confirmed that excellent purification performance can be exhibited for CO, HC and $NO_x$ in exhaust gas, from low temperature to high temperature, by using a catalyst, which is composed of at least the upper and lower two layers, containing a rhodium and a cerium-zirconium-type composite oxide (C) containing a pyrochlore phase in a crystal structure in the upper side layer on a honeycomb type structure; and containing palladium, or palladium and platinum, and a cerium-containing oxide (C') of a cubic crystal and/or a tetragonal crystal as a major crystal structure in the lower side layer, and have thus completed the present invention.

That is, according to a first aspect of the present invention, there is provided an exhaust gas purification catalyst, characterized in that a catalyst composition for purifying hydrocarbons (HC), carbon monoxide (CO) and nitrogen oxides ($NO_x$) contained in exhaust gas is coated onto a honeycomb type structure with at least the upper and lower two layers as follows:

<The Upper Layer>

A catalyst composition comprising an activated metal (A), a heat resistant inorganic oxide (B) and a cerium-zirconium-type composite oxide (C) containing a pyrochlore phase in a crystal structure, wherein the activated metal (A) is rhodium.

<The Lower Layer>

A catalyst composition comprising an activated metal (A), a heat resistant inorganic oxide (B) and a cerium-containing oxide (C') having a cubic crystal and/or a tetragonal crystal as a major crystal structure, wherein the activated metal (A) is palladium, or palladium and platinum.

2. The exhaust gas purification catalyst according to claim 1, characterized in that the activated metal (A) of the lower layer is palladium.

In addition, according to a second aspect of the present invention, there is provided the exhaust gas purification catalyst in the first aspect, characterized in that the activated metal (A) of the lower layer is palladium.

In addition, according to a third aspect of the present invention, there is provided the exhaust gas purification catalyst in the first aspect, characterized in that content of the activated metal (A) is from 0.01 to 10 g/L in both of the upper layer and the lower layer, per unit volume of the honeycomb type structure.

Still more, according to a fourth aspect of the present invention, there is provided the exhaust gas purification catalyst in the first aspect, characterized in that the heat resistant inorganic oxide (B) is at least one kind selected from alumina, zirconia, silica, titania, silica-alumina, or zeolite.

In addition, according to a fifth aspect of the present invention, there is provided the exhaust gas purification catalyst in the first or fourth aspect, characterized in that the heat resistant inorganic oxide (B) has zirconia as a main component in the upper layer, and on the other hand alumina as a main component in the lower layer.

In addition, according to a sixth aspect of the present invention, there is provided the exhaust gas purification catalyst in the first aspect, characterized in that the cerium-zirconium-type composite oxide (C) is obtained by crushing an ingot, which is melted a raw material mixture under heating at temperature of equal to or higher than melting point thereof, and then is formed by cooling, and when an average particle size is from 1 to 100 µm, specific surface area thereof is equal to or smaller than 20 m²/g.

In addition, according to a seventh aspect of the present invention, there is provided the exhaust gas purification catalyst in the sixth aspect, characterized in that the cerium-zirconium-type composite oxide (C) is still more crushed, and the average particle size is from 0.3 to 2 µm.

In addition, according to an eighth aspect of the present invention, there is provided the exhaust gas purification catalyst in the first, sixth or seventh aspect, characterized in that cerium and zirconium of the cerium-zirconium-type composite oxide (C) are contained in a ratio of $CeO_2/ZrO_2$=1/9 to 9/1, based on molar ratio as converted to an oxide.

In addition, according to a ninth aspect of the present invention, there is provided the exhaust gas purification catalyst in the first, sixth, seventh or eighth aspect, characterized in that content of the cerium-zirconium-type composite oxide (C) is from 3 to 200 g/L, per unit volume of the honeycomb type structure.

In addition, according to a tenth aspect of the present invention, there is provided the exhaust gas purification catalyst in the first aspect, characterized in that the cerium-containing oxide (C') is obtained by firing a raw material mixture under heating at temperature of below melting point thereof, and then by cooling and crushing, and when an average particle size is from 1 to 100 µm, specific surface area value thereof is from 10 to 300 m²/g.

In addition, according to a eleventh aspect of the present invention, there is provided the exhaust gas purification catalyst in the first or tenth aspect, characterized in that content of the cerium-containing oxide (C') is from 5 to 200 g/L, per unit volume of the honeycomb type structure.

In addition, according to a twelfth aspect of the present invention, there is provided the exhaust gas purification catalyst in the first aspect, characterized in that a barium component is still more contained in the catalyst composition of the lower layer, and content thereof is from 1 to 30 g/L as converted to an oxide.

Still more, according to a thirteenth aspect of the present invention, there is provided the exhaust gas purification catalyst in the first aspect, characterized in that the honeycomb type structure is a flow-through-type carrier with a cell density of from 10 to 1500 cell/inch².

On the other hand, according to a fourteenth aspect of the present invention, there is provided an exhaust gas purification apparatus having by arranging the catalyst relevant to any one of the first to the thirteenth aspects, in a passage of exhaust gas discharged from an internal combustion engine.

In addition, according to a fifteenth aspect of the present invention, there is provided the exhaust gas purification apparatus in the fourteenth aspect, characterized in that the internal combustion engine is a gasoline engine.

Still more, according to a sixteenth aspect of the present invention, there is provided an exhaust gas purification method, characterized in that hydrocarbons (HC), carbon monoxide (CO) and nitrogen oxides ($NO_x$) contained in exhaust gas are purified by bringing an exhaust gas discharged from an internal combustion engine into contact with the exhaust gas purification apparatus relevant to the fifteenth aspect.

The exhaust gas purification catalyst of the present invention is capable of purifying HC, CO and $NO_x$, which are harmful components in exhaust gas, under environment where temperature of exhaust gas varies from low temperature to high temperature, and thus exerting excellent purification performance, in particular, when used as the TWC.

In addition, according to the exhaust gas purification apparatus, where this exhaust gas purification catalyst is arranged in a passage of exhaust gas discharged from an internal combustion engine, $NO_x$ in exhaust gas of an automobile can be purified efficiently. In addition, it is capable of purifying HC, CO and $NO_x$, which are harmful components in exhaust gas, under environment where oxygen concentration and HC concentration vary.

BRIEF DESCRIPTION OF THE DRAWINGS

FIG. (A), at the upper side of FIG. 1, is a chart showing measurement results of structural change of a cerium-zirconium-type composite oxide (C) before and after a durability test under heating, using an X-ray diffraction apparatus (XRD); and FIG. (B), at the lower side, is a chart showing the results in the case of a cerium-zirconium-type composite oxide (C').

DETAILED DESCRIPTION OF THE INVENTION

Figure 1:
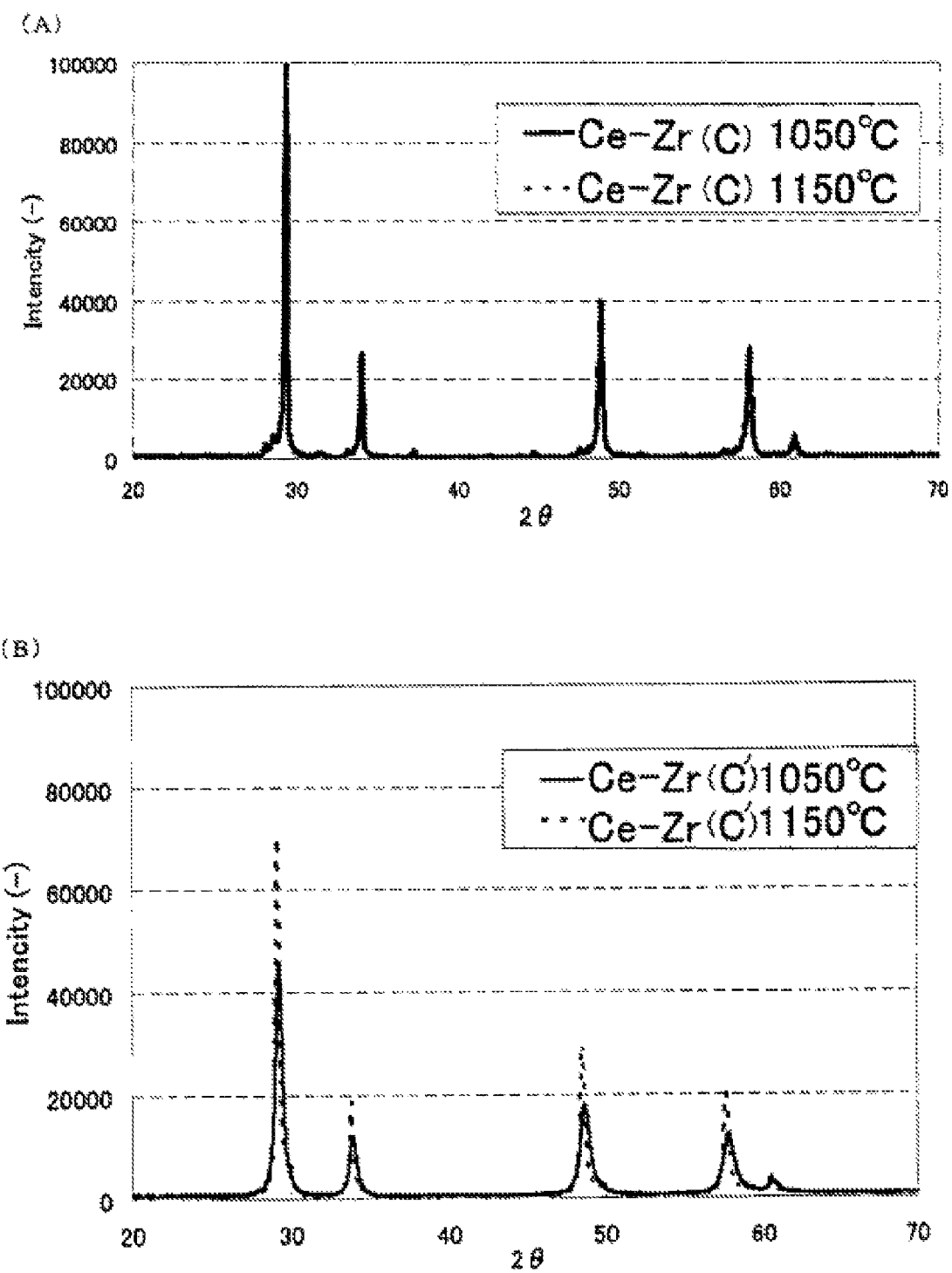

Explanation will be given below in detail on the exhaust gas purification catalyst, the exhaust gas purification apparatus using the same, and the exhaust gas purification method of the present invention, mainly on the TWC among the exhaust gas purification catalysts for an automobile, with reference to drawings.

1. The Exhaust Gas Purification Catalyst for an Automobile

The exhaust gas purification catalyst of the present invention is a honeycomb type structure-type catalyst, where the catalyst component is coated onto the honeycomb type structure with two or more layers. In addition, in the upper side layer of an exhaust gas flow side (upper layer), there is included the heat resistant inorganic oxide (B) supported rhodium of the catalytically activated metal, and the cerium-zirconium-type composite oxide (C) (hereafter may be referred to as Ce.Zr(C)); and in the lower side layer (lower layer), there is included the heat resistant inorganic oxide (B) supported palladium, or palladium and platinum of the catalytically activated metal, and the cerium-containing oxide (C') (hereafter may be referred to as Ce(C') having a cubic crystal and/or a tetragonal crystal as a major crystal structure, and in particular when zirconium is included, may be referred to as Ce.Zr(C')).

That is, the exhaust gas purification catalyst of the present invention (hereafter may be referred to as a honeycomb type structure-type catalyst) is one where the catalyst composition combined the catalyst materials such as the catalytically activated metal, the heat resistant inorganic oxide, Ce.Zr(C) and Ce.Zr(C') is coated onto the honeycomb type structure with two or more layers.

[The Catalytically Activated Metal (A)]

In the present invention, as the activated metal (hereafter maybe referred to also as an activated metal specie or a metal catalyst component), rhodium and palladium are used. In the present invention, the metal catalyst component contains rhodium in the upper layer, and contains palladium, or palladium and platinum, as a noble metal to be used as a major activated specie, in the lower layer. Because it is desirable that such a catalytically activated metal is stable against heat or atmosphere, and also has high activity, it is desirable that it is supported onto the heat resistant inorganic oxide, which becomes a base material.

Rhodium is a component which enhances purification performance of $NO_x$ in the TWC application. Content of rhodium component is preferably 0.01 to 10 g/L, and more preferably 0.1 to 5 g/L, per unit volume of the honeycomb type structure. The too low content of the rhodium component cannot provide sufficient purification performance of $NO_x$, while the too much content may not provide enhancement of purification performance comparable to use amount, in some cases. The rhodium component has effect to promote purification of $NO_x$ by hydrogen generated by a steam reforming reaction or a water gas shift reaction.

Action of the steam reforming reaction in NO purification is as represented by the following chemical formulas (1) and (2).

(1)

(2)

Because rhodium of an activated metal promotes the steam reforming reaction by a combined use with zirconium (refer WO2000/027508, page 14), this action can be utilized to reduction of $NO_x$. In the present invention too, it is considered that mechanism similar to this is generated at least partially.

The water gas shift reaction is a reaction to generate hydrogen as in the following reaction formula (3), by utilization of CO in exhaust gas, and the reaction is accelerated at a relatively low temperature (refer to JP-A-2007-196146, paragraph 0008 or the like).

(3)

It is preferable that content of the palladium component to be used in the present invention is from 0.01 to 10 g/L, and more preferably from 0.5 to 10 g/L, based on unit volume of the honeycomb type structure. The content less than 0.01 g/L may not provide sufficient purification performance of CO and HC, in some cases, while the content more than 10 g/L may not provide enhancement of performance comparable to use amount, in some cases.

In the present invention, it has been confirmed that purification performance of $NO_x$ is enhanced more by using palladium, as the catalytically activated metal of the lower layer, as compared with using platinum alone. Although reason therefor is not certain, it is estimated to be caused by tendency to maintain higher catalytic activity by palladium than platinum, in petroleum with advanced sulfur content reduction.

Metal catalyst components applicable to the present invention are rhodium, palladium and platinum, and may include, in addition to these, a transition metal, a rare earth metal or the like. As the transition metal, iron, nickel, cobalt, zirconium, copper, or the like, and as the rare earth metal, a noble metal such as gold and silver may be included, in addition to lanthanum, praseodymium and neodymium, and one or more kinds can be selected as appropriate from these.

In addition, although the palladium component is used in the lower catalyst layer of the present invention, the platinum component can be added to make up for activity decrease of the palladium component caused by sulfur poisoning, for exhaust gas discharged by using fuel containing a large quantity of the sulfur component. However, even in the case where the platinum component is used in the lower layer, it is desirable to reduce use amount thereof as much as possible, to obtain effect of the present invention.

It is preferable that content of the platinum component to be used together with palladium is equal to or less than 0.5 g/L, and more preferably equal to or less than 0.1 g/L, per unit volume of the honeycomb type structure. The content more than 0.5 g/L may not provide enhancement of performance comparable to use amount (cost), in some cases.

[The Heat Resistant Inorganic Oxide (B)]

In the present invention, it is desirable that the activated metal (A) is supported onto the heat resistant inorganic oxide (hereafter may be referred to also as an inorganic base material, or simply as a base material).

As the base material, a porous inorganic material having high heat resistance and large specific surface area, is preferable and, for example, activated alumina such as γ-alumina, O-alumina; zirconia, cerium-zirconium composite oxide, ceria, titanium oxide, silica, various kinds of zeolites can be used. As such a porous inorganic base material, base materials having still more enhanced heat resistance may be used, by adding a rare earth group such as lanthanum, cerium, barium, praseodymium or strontium, or an alkaline earth metal.

And, as the base material of the rhodium component, it is preferable to include a zirconia component, in view of promoting the steam reforming reaction, and although a composite oxide of zirconia and alumina, other than pure zirconia, can be used, it is preferable to use zirconia as a main component in the case of such a composite oxide too. In addition, as a base material of the palladium component, or the palladium and platinum components, it is preferable to be one or more kinds selected from γ-$Al_2O_3$, or lanthanum-added γ-$Al_2O_3$.

Lanthanum-added γ-alumina is superior in heat resistance, and in the case where a noble metal is supported thereon, it is possible to maintain high catalytic activity even at high temperature (refer to JP-A-2004-290827). It should be noted that the main component referred to in the present invention means occupation by the relevant component in a quantity of at least over half in the substance.

As γ-alumina, one having a specific surface area (measured by the BET method; the same hereafter) of equal to or higher than 30 m$^2$/g, and still more equal to or higher than 90 m$^2$/g is preferable. The specific surface area value of γ-alumina of equal to or higher than 30 m$^2$/g is capable of stabilizing the noble metal in a highly dispersed state. Because the cerium-zirconium-type composite oxide (C) has excellent resistance at high temperature, combined use of this with lanthanum-added γ-alumina is capable of obtaining a catalyst composition having excellent stability at high temperature.

[The Cerium-Zirconium-Type Composite Oxide (C)]

The cerium-zirconium-type composite oxide, that is, Ce.Zr (C), contains the pyrochlore phase in the crystal structure. As such Ce.Zr(C), it is desirable to be the cerium-zirconium-type composite oxide (C) is obtained by crushing an ingot, which is melted a raw material mixture under heating at temperature of equal to or higher than melting point thereof, and then is formed by cooling. The cerium-zirconium-type composite oxide melted under heating at temperature of equal to or higher than melting point in this way, is obtained as follows.

The element materials of a raw material mixture to be used can be any one as long as at least one of them is melted, when the element materials are heated in a production step of a composite oxide shown below. The cerium raw material and the zirconium raw material are preferably oxides. Melting point of cerium oxide is 2200° C., and melting point of zirconium oxide is 2720° C. Thus, the oxide of the element material has high melting point, however, in the case where cerium oxide and/or zirconium oxide are used as the element materials, there may be the case where a melting state can be obtained even at lower heating temperature than melting point of the oxide, because of influence of melting point depression. Small quantity of a nitrate salt, a carbonate salt, a sulfate salt, a chloride salt, a bromide salt of cerium or zirconium may be formulated into these raw materials. Formulation of such a raw material compound other than the oxide may promote melting in the production step, in some cases.

In addition, in order to lower the melting point, a third component such as trace quantity of flux is formulated, in some cases. Melting point of the raw material mixture where these element materials are mixed, differs depending on molar ratio of ceria/zirconia, and specifically, it is about 2600° C. for the case of CeO$_2$/ZrO$_2$ (molar ratio)=1/9, about 2200° C. for the case of the molar ratio=5/5, and about 2000° C. for the case of the molar ratio=9/1.

In the case where materials other than the cerium element material and the zirconium element material are used in combination as the third component, alkali metal, alkaline earth metal, rare earth metal, noble metal components and the like may be added, as long as it is in a range not to impair characteristics of the OSC material to be obtained. In more specifically, potassium, rubidium, cesium, magnesium, calcium, strontium, barium, antimony, hafnium, tantalum, rhenium, bismuth, praseodymium, neodymium, samarium, gadolinium, holmium, thulium, ytterbium, germanium, selenium, cadmium, indium, scandium, titanium, niobium, chromium, iron, silver, rhodium, platinum and the like are included. In addition, such a third component may be included by being derived from impurities in the cerium element material and the zirconium element material. However, it is natural that in the case where such a third component is a hazardousness regulation subject, it is desirable to reduce quantity thereof, or remove it.

The above cerium raw material and the zirconium raw material are mixed in predetermined ratio, and then charged into a melting apparatus. The melting method is not especially limited, as long as it is a method for melting at least one kind of the raw material mixture, and an arc-type, a high frequency thermal plasma-system and the like are exemplified. Among others, a general electric melting method, that is, a melting method using an arc-type electric furnace may preferably be utilized.

In the case of the melting method using the arc-type electric furnace, predetermined quantity of coke is added, as an electrically conductive material, to promote initial energization, if necessary, to the mixed cerium raw material and the zirconium raw material, although it depends on mixing ratio of the cerium raw material and the zirconium raw material. Subsequently, for example, it is heated under condition of a secondary voltage of from 70 to 100 V, an average load electric power of from 80 to 100 kW, and a temperature of equal to or higher than 2400° C. It is desirable that the raw material mixture of the cerium-zirconium-type composite oxide is melted under heating for from 0.5 to 3 hours. By maintaining the raw material for equal to or longer than 0.5 hour, after reaching a molten state, uniform melting can be attained. Heating temperature can be any level as long as it is equal to or higher than 2000° C., however, it is preferable to be equal to or higher than melting point of the raw materials, in particular, from 2600 to 2800° C. Holding time in a molten state is preferably set for from 1 to 2 hours. It should be noted that atmosphere in melting is not especially limited, and in addition to air atmosphere, inert gas atmosphere such as in nitrogen, argon, helium may be employed. In addition, pressure is not especially limited, and any of a normal pressure state, a pressurized state and a reduced pressure state can be employed, however, usually an atmospheric pressure state may be employed.

After completion of the melting, by covering the electric furnace with a carbon lid, and by gradually cooling for from 20 to 30 hours, an ingot is obtained. A cooling method for the molten substance is not especially limited, however, usually, the ingot is taken out from the melting apparatus to be subjected to standing to cool in air, so as to attain equal to or lower than 100° C., and preferably equal to or lower than 50° C.

In this way, the ingot of the cerium-zirconium-type composite oxide can be obtained, where the cerium raw material and the zirconium raw material became uniform. Content ratio of cerium and zirconium of the cerium-zirconium-type composite oxide obtained in this way is not especially limited, however, CeO$_2$/ZrO$_2$ is 1/9 to 9/1, and still more preferably 2/3 to 3/2, based on molar ratio. Such a composition ratio is capable of providing excellent oxygen storage and discharge performance, and heat resistance.

The ingot after melting is then crushed. A crushing method for the ingot is not especially limited, however, it is desirable to be crushed so that particle size of the cerium-zirconium-type composite oxide is equal to or smaller than 3 mm. The ingot can be crushed with a crusher such as a jaw crusher or a roll crusher. In consideration of handling at the latter steps, it is preferable to crush and classify the ingot, so as to become powder with a size of equal to or smaller than 1 mm.

It should be noted that the resulting powder is charged into the electric furnace or the like, if necessary, after separation of impurities and the like by magnetic separation, to remove a suboxide in the melting step or the strain inside a crystal by super-cooling, by an oxidative firing. Condition of the oxidative firing is not especially limited as long as it is condition enabling oxidation of the ingot or powder, however, usually the firing can be attained at from 100° C. to 1000° C., and preferably at from 600° C. to 800° C. In addition, firing time is not especially limited, however, from 1 to 5 hours, and preferably from 1 to 3 hours can be employed.

Powder obtained by the above method can be subjected to still more fine crushing, corresponding to applications. The fine crushing is not especially limited, however, it can be attained with a crusher such as a planet mill, a ball mill, or a jet mill for from 5 to 30 minutes. It is preferable that the cerium-zirconium-type composite oxide has an average particle size of from 0.3 to 2.0 μm, in particular, from 0.5 to 1.5 μm, by this fine crushing. Although detailed reason is not clear, it is considered that increased surface area of the composite oxide by fine crushing enables to discharge a large quantity of oxygen at a low temperature region. It should be noted that the average particle size can be analyzed with a laser diffraction scattering apparatus or the like.

In this way, powder of the cerium-zirconium composite oxide containing cerium and zirconium in a ratio of 1/9 to 9/1, based on $CeO_2/ZrO_2$ can be obtained. It is preferable that this powder has, when an average particle size is from 1 to 100 μm, a specific surface area thereof of equal to or smaller than 20 $m^2/g$, preferably equal to or smaller than 10 $m^2/g$ and more preferably equal to or smaller than 5 $m^2/g$.

This cerium-zirconium-type composite oxide was subjected to a durability test under heating to measure structure change before and after the test, with an X-ray diffraction apparatus (XRD), providing results as shown in FIG. 1(A). Because waveforms of the main peak (it corresponds to $Zr_{0.5}Ce_{0.5}O_2$) after firing in high temperature atmosphere at 1050° C. and 1150° C., overlapped similarly, it was clear to have sufficient thermal stability, and at the same time, to have a large crystal structure, because the main peak is extremely sharp.

As for such Ce.Zr(C), when change of crystallite size is observed, average crystallite size of the cerium-zirconium-type composite oxide after firing in high temperature atmosphere at 1050° C. and 1150° C. is calculated from Scherrer equation and an XRD profile (half bandwidth), and any of them was found to be from 50 to 100 nm, showing no remarkable change, and also main peaks by XRD measurement are those nearly overlapped.

It is preferable that such Ce.Zr(C) is used as a catalyst composition of the upper layer in the exhaust gas purification catalyst of the present invention, and content thereof is preferably from 3 to 200 g/L, and more preferably from 5 to 100 g/L, per unit volume of the honeycomb type structure. The too much quantity of Ce.Zr(C) reduces cross-sectional area of through holes of the honeycomb type structure, resulting in increase in back pressure and may decrease engine performance, while the too less quantity may not exert performance of Ce.Zr(C).

[The Cerium-Containing Oxide (C')]

In the TWC, reducing components such as CO and HC are reacted with oxygen in exhaust gas and removed by oxidation, and $NO_x$ is purified by reduction. It should be noted that oxygen concentration in exhaust gas discharged from an automobile varies every second. In addition, purification of $NO_x$ is promoted under atmosphere of exhaust gas combusted under equal to or lower than theoretical air/fuel ratio. It is because components to reduce $NO_x$ in exhaust gas increase.

However, in an automotive engine, fuel may be combusted under lean air/fuel ratio of equal to or larger than theoretical air/fuel ratio. In recent years, enhancement of fuel economy has been desired in care for environment, and this tendency has been increasing more and more. Under such environment, promotion of purification of $NO_x$ is difficult. Accordingly, with a main object of buffering such variation of oxygen concentration in exhaust gas, purification of $NO_x$ is promoted by formulating the OSC into a composition of the exhaust gas purification catalyst, and increasing a concentration of reducing components by absorbing oxygen when oxygen concentration in exhaust gas is high. In addition, oxygen absorbed into the OSC supplies oxygen into exhaust gas when oxygen concentration in exhaust gas is low, so as to oxidize CO and HC.

In this way, usually as the OSC, Ce.Zr(C'), which was fired at temperature equal to or lower than melt temperature of a raw material mixture, has been used, and it has been known that a crystal structure thereof is a cubic crystal and/or a tetragonal crystal (JP-A-2002-336703, paragraph 0012 and paragraph 0029).

In the exhaust gas purification catalyst of the present invention, the cerium-containing oxide (C') as the OSC is used in the lower layer. As this cerium-containing oxide (C'), the cerium-zirconium-type composite oxide (Ce.Zr(C')) is preferable.

The Ce.Zr(C') is superior in heat resistance at high temperature, and as described in JP-B-6-75675, it is obtained by mixing a cerium salt and a zirconium salt as raw materials, and firing at a temperature of equal to or lower than 1000° C., and 1300° C. at most, under condition where melt substances do not generate. In addition, each raw material may be used not by mixing but by a co-precipitation method or the like as a raw material mixture.

Using Ce.Zr(C') obtained in this way, the durability test under heating was carried out to measure structure change before and after the test, with the X-ray diffraction apparatus (XRD), and obtained the result as shown in FIG. 1(B). In Ce.Zr(C') obtained by not melting under heating at high temperature of equal to or higher than melting point of the raw material mixture in this way, because a main peak (it corresponds to $Zr_{0.5}Ce_{0.5}O_2$) to be observed after firing in high temperature air of 1050° C. and 1150° C., became sharp gradually, it was found that change of a physical state in durability at high temperature was significant. In addition, thermal stability was obviously inferior, as compared with the above cerium-zirconium-type composite oxide (C).

When change of crystallite size was confirmed as for such Ce.Zr (C') too, average crystallite size of the cerium-containing oxide (C') after firing in high temperature atmosphere at 1050° C. and 1150° C. is calculated, similarly as in the above, from Scherrer equation and an XRD profile (half bandwidth), and was found to be from 5 to 20 nm at 1050° C., but 30 to 50 nm at 1150° C., nearly two times or more.

Specific surface area of this Ce.Zr(C') is from 10 to 300 $m^2/g$, preferably from 20 to 200 $m^2/g$ and more preferably from 30 to 100 $m^2/g$. One having the specific surface area of below 10 $m^2/g$ may not exhibit sufficient activity, while one having the specific surface area of over 300 $m^2/g$ has insufficient heat stability, and thus not preferable.

It is preferable that Ce.Zr(C') is used from 5 to 200 g/L, and preferably from 10 to 100 g/L, per unit volume of the honeycomb type structure. The too much quantity of Ce.Zr(C') reduces cross-sectional area of through holes of the honeycomb type structure, resulting in increase in back pressure and may decrease engine performance, while the too less quantity may not exert performance of Ce.Zr(C').

[The Honeycomb Type Structure]

The exhaust gas purification catalyst of the present invention is used as a honeycomb type structure-type catalyst where the above each catalyst component is coated onto the surface of the honeycomb type structure.

Shape of the honeycomb type structure is not especially limited, and can be selected from known honeycomb type structures (one-piece structure-type carrier). As a material of such one-piece structure-type carrier, a metal and ceramics are included. In the case of a metal, one made of stainless steel is general, and as shape thereof, a honeycomb-like one is general. A material of the ceramics includes cordierite, mullite, alumina, magnesia, spinel, silicon carbide, or the like, however, one made of cordierite is preferable in view of good formability in preparation of the honeycomb and superiority in heat resistance or mechanical strength.

In the TWC application, a flow-through-type carrier made of cordierite is preferable from the viewpoints that stability can be enhanced by increasing easiness of production, strength as a structure, suppression (maintaining good discharge of exhaust gas) of pressure loss accompanying with installment of a structural catalyst, coating quantity of catalyst components or the like.

External shape of this one-piece structure-type carrier is arbitrary, and can be selected as appropriate in response to a structure of an exhaust system to which a catalyst is applied, such as circular cylinder-type having round circle or ellipse cross-section, quadratic prism-type, hexagonal column-type or the like. Hole number of the opening part of the one-piece structure-type carrier is also determined suitably in consideration of kind of exhaust gas to be treated, gas flow quantity, pressure loss, or removal efficiency or the like, however, in the exhaust gas purification apparatus for an automobile, it is desirable to be about from 10 to 1500 pieces per 1 inch$^2$.

In a carrier of honeycomb shape such as the flow-through-type carrier, structural characteristics thereof are represented by cell density. In the present invention, it is preferable to be the flow-through-type carrier having a cell density of from 10 to 1500 cell/inch$^2$, and in particular, 300 to 900 cell/inch$^2$. The cell density of equal to or higher than 10 cell/inch is capable of securing contact area between exhaust gas and a catalyst required for purification, and obtaining purification performance of exhaust gas, along with excellent structural strength, and the cell density of equal to or lower than 1500 cell/inch$^2$ is capable of securing contact area between exhaust gas and a catalyst sufficiently, without large pressure loss of exhaust gas of an internal combustion engine, and without impairing performance of the internal combustion engine. In particular, in the TWC for a gasoline engine, the flow-through-type carrier having the cell density of from 300 to 900 cell/inch$^2$ is preferable in view of suppression of pressure loss.

In the present invention, two kinds of catalyst compositions for purifying hydrocarbons (HC), carbon monoxide (CO) and nitrogen oxides (NO$_x$) contained in exhaust gas are coated onto the honeycomb type structure at least as the upper and lower two layers.

[The Upper Layer]

The upper layer of the exhaust gas purification catalyst of the present invention includes a catalyst composition having the activated metal (A), the heat resistant inorganic oxide (B) and the cerium-zirconium-type composite oxide (C) containing the pyrochlore phase in the crystal structure, wherein the catalyst components, in which the activated metal (A) is rhodium, are used. That is, the Rh component as the activated metal, the heat resistant inorganic oxide as a dispersing agent or a base material of the Rh component, and Ce.Zr(C) as the OSC component are contained.

In the case where the catalyst composition is made in multi-layer, there is a tendency that purification of the exhaust gas components is promoted in the upper side catalyst layer (the upper layer) where contact with the exhaust gas components is easy. In the exhaust gas purification catalyst, in particular, in the TWC, in addition to Rh, Pt or Pd is used, however, production quantity of Rh is low and Rh price is high as compared with Pt or Pd. Therefore, by using Rh in the upper layer of the honeycomb type structure-type catalyst, purification of NO$_x$ in exhaust gas is promoted by small quantity of the Rh component.

In addition, in the upper layer of the exhaust gas purification catalyst of the present invention, Ce.Zr(C) is used, which is capable of discharging oxygen continuously for a long period of time, and discharge quantity of oxygen is also much.

Reason for enhancing purification performance of NO$_x$ by using Ce.Zr (C) in the upper layer, as compared with using only Ce.Zr (C'), is not certain, however, it is considered that difference of OSC performance of both may have influence.

Figure 2:
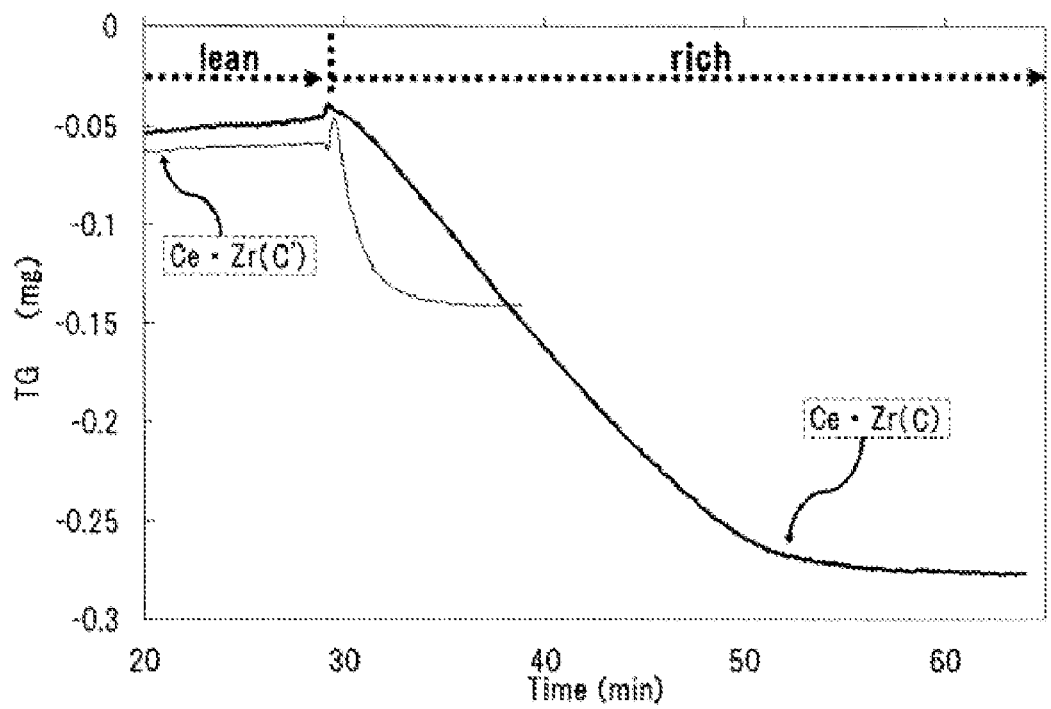
FIG. 2 is a chart showing change with time of oxygen quantity discharged from cerium-zirconium-type composite oxides (C) and (C').
Figure 3:
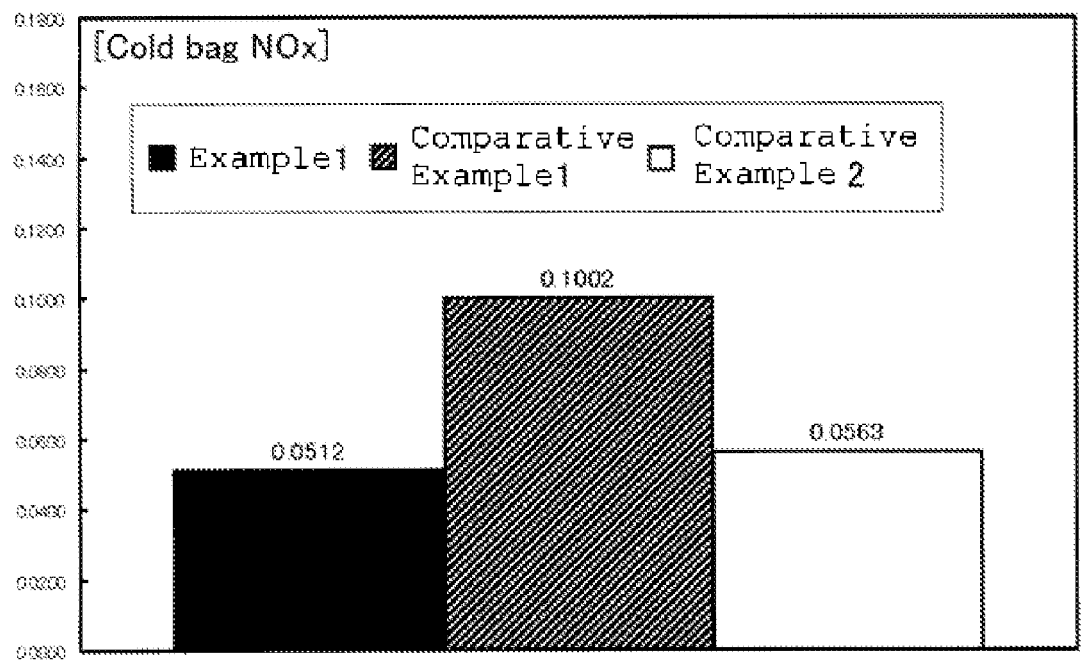
FIG. 3 is a graph of measurement of quantity of $NO_x$ components in a "Cold Bag" of an exhaust gas purification apparatus in Example 1, Comparative Example 1 and Comparative Example 2.
Figure 4:
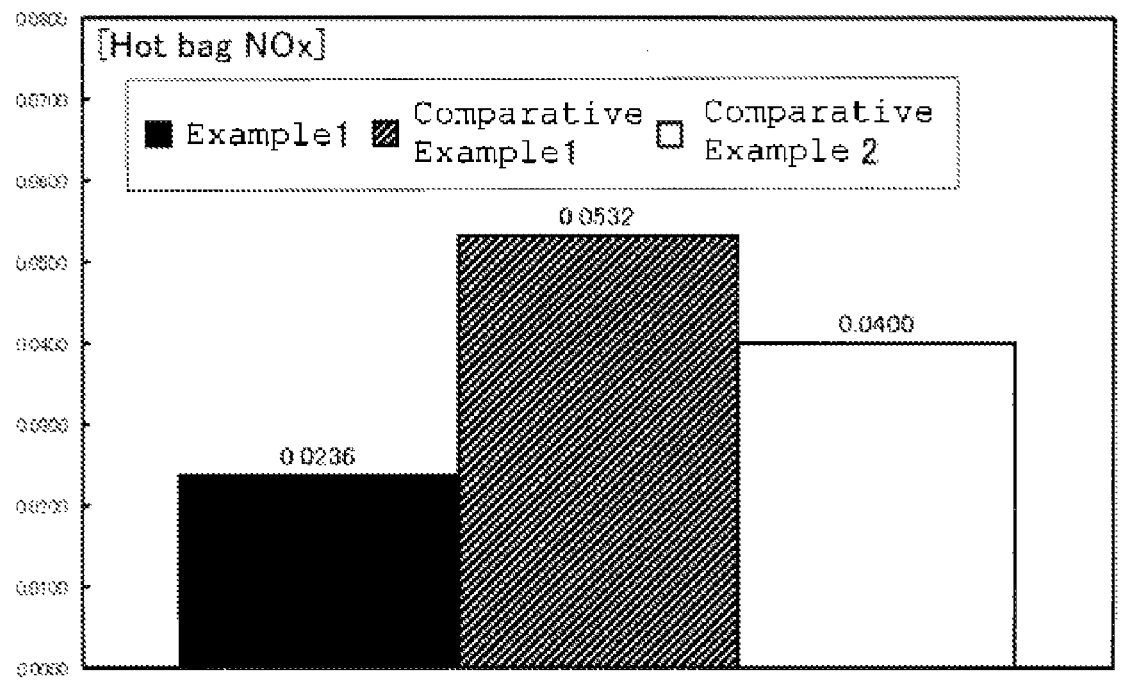
FIG. 4 is a graph of measurement of quantity of $NO_x$ components in a "Hot Bag" of an exhaust gas purification apparatus in Example 1, Comparative Example 1 and Comparative Example 2.
Figure 5:
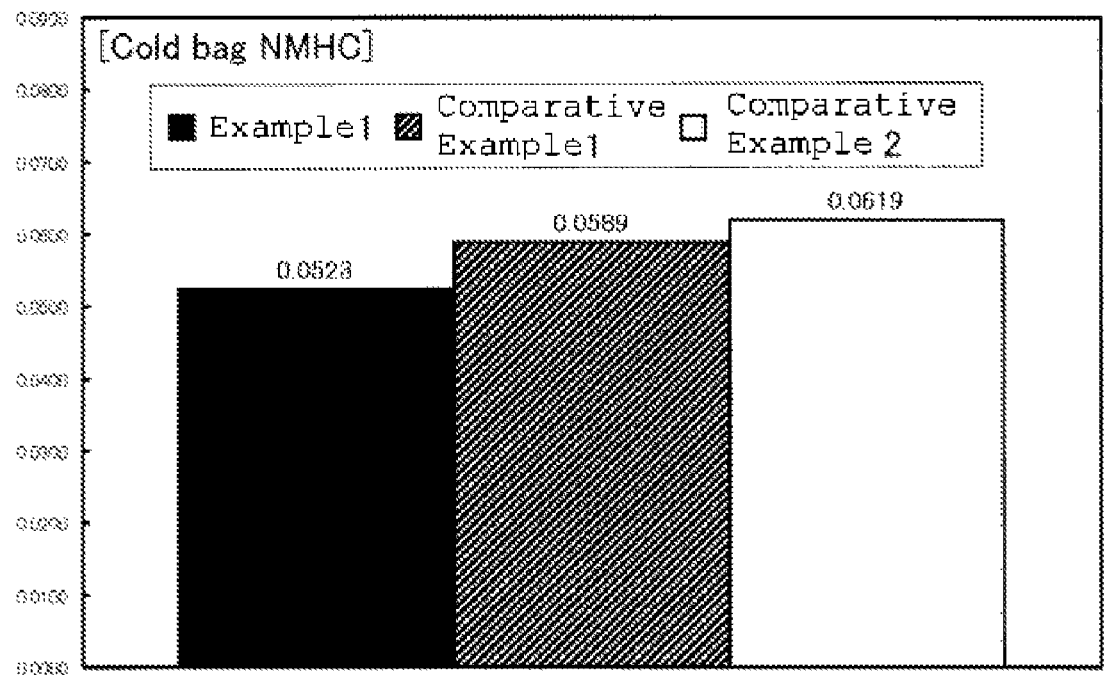
FIG. 5 is a graph of measurement of quantity of NMHC (non-methane hydrocarbons) components in a "Cold Bag" of an exhaust gas purification apparatus in Example 1, Comparative Example 1 and Comparative Example 2.
Figure 6:
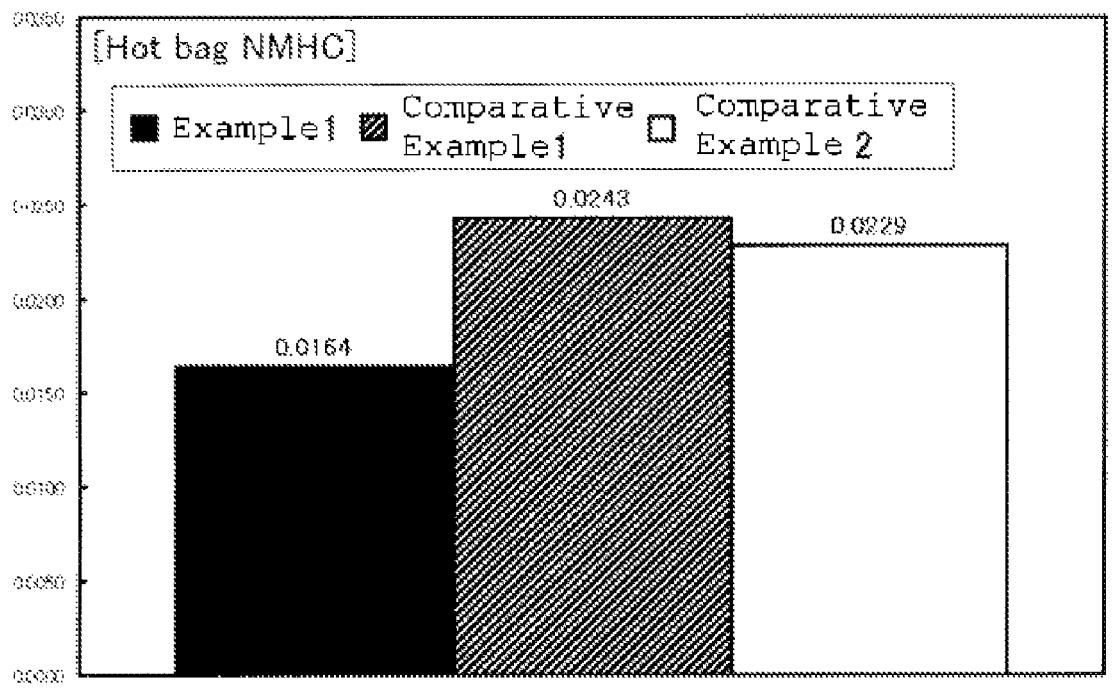
FIG. 6 is a graph of measurement of quantity of NMHC (non-methane hydrocarbons) components in a "Hot Bag" of an exhaust gas purification apparatus in Example 1, Comparative Example 1 and Comparative Example 2.
Figure 7:
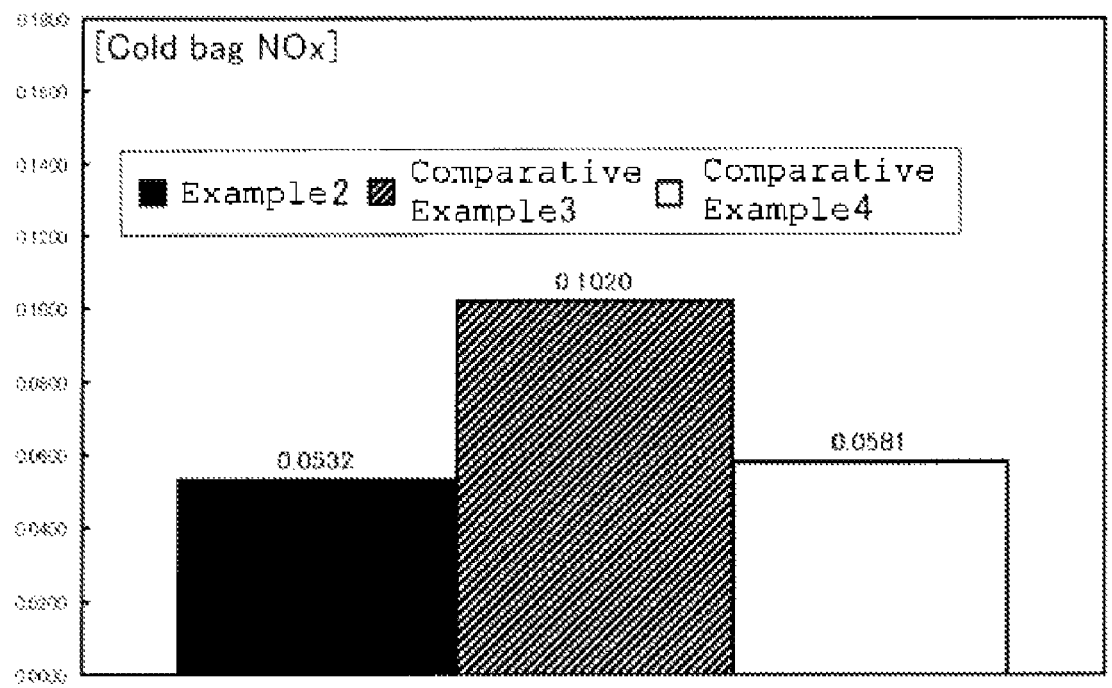
FIG. 7 is a graph of measurement of quantity of $NO_x$ components in a "Cold Bag" of an exhaust gas purification apparatus in Example 2, Comparative Example 3 and Comparative Example 4.
Figure 8:
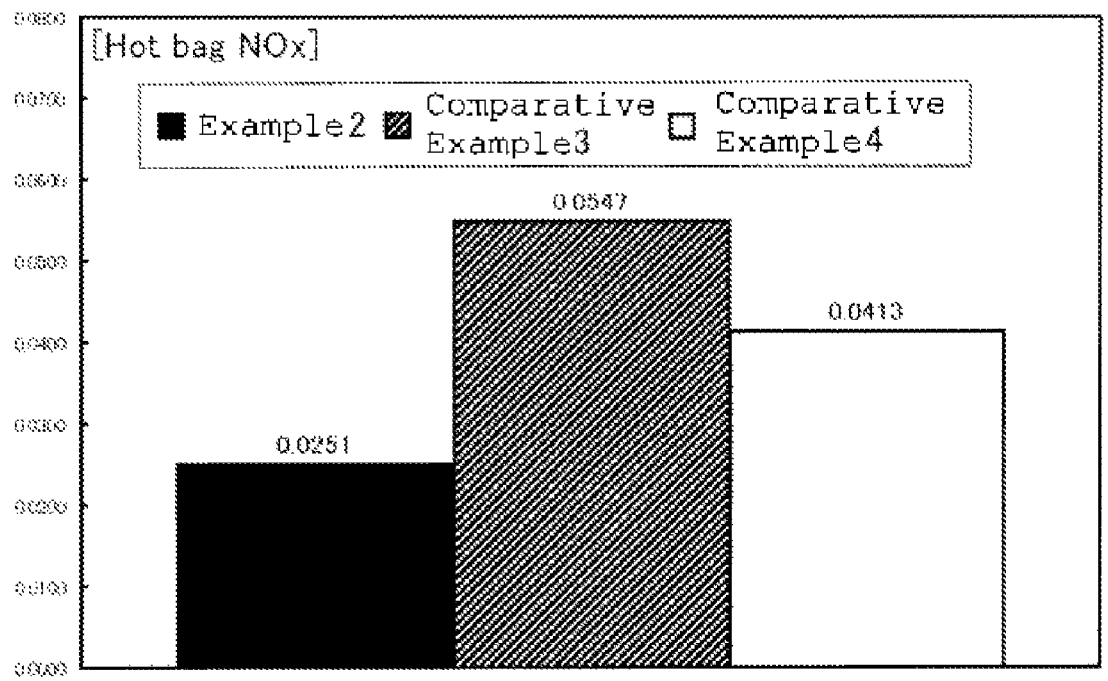
FIG. 8 is a graph of measurement of quantity of $NO_x$ components in a "Hot Bag" of an exhaust gas purification apparatus in Example 2, Comparative Example 3 and Comparative Example 4.
Figure 9:
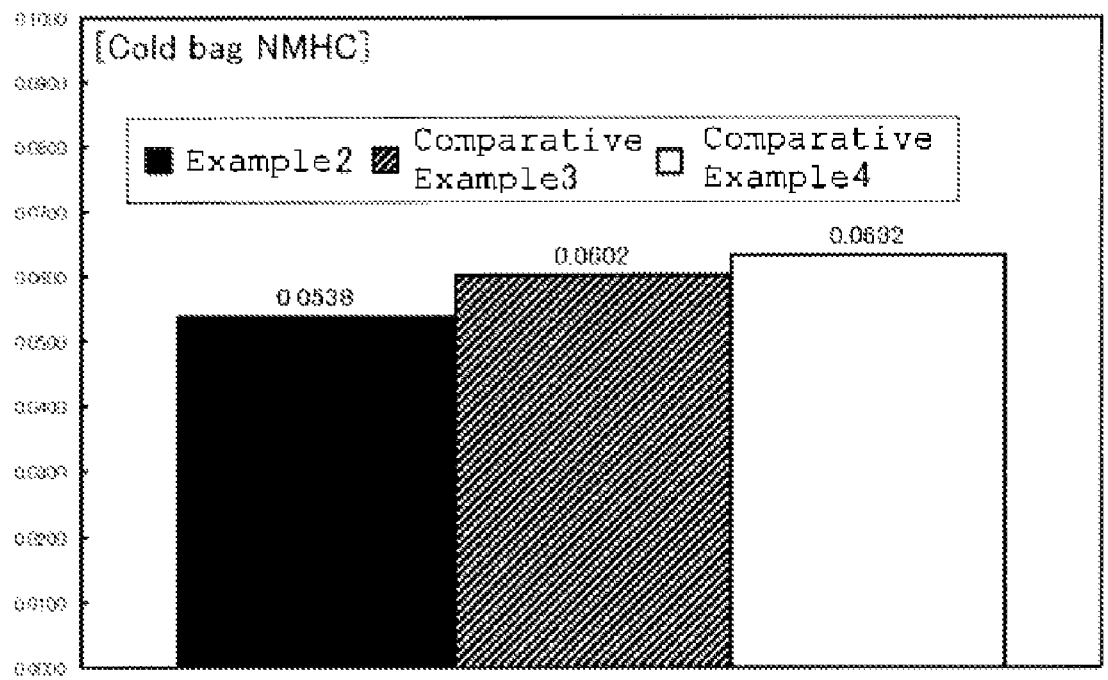
FIG. 9 is a graph of measurement of quantity of NMHC (non-methane hydrocarbons) components in a "Cold Bag" of an exhaust gas purification apparatus in Example 2, Comparative Example 3 and Comparative Example 4.
Figure 10:
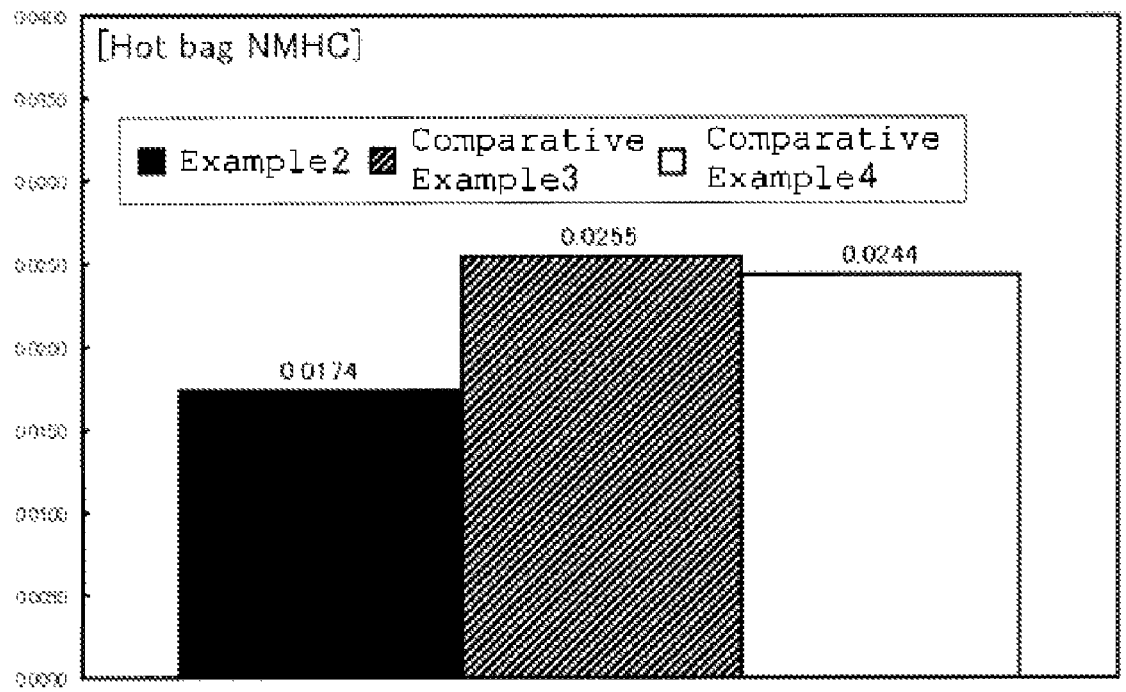
FIG. 10 is a graph of measurement of quantity of NMHC (non-methane hydrocarbons) components in a "Hot Bag" of an exhaust gas purification apparatus in Example 2, Comparative Example 3 and Comparative Example 4.
Figure 11:
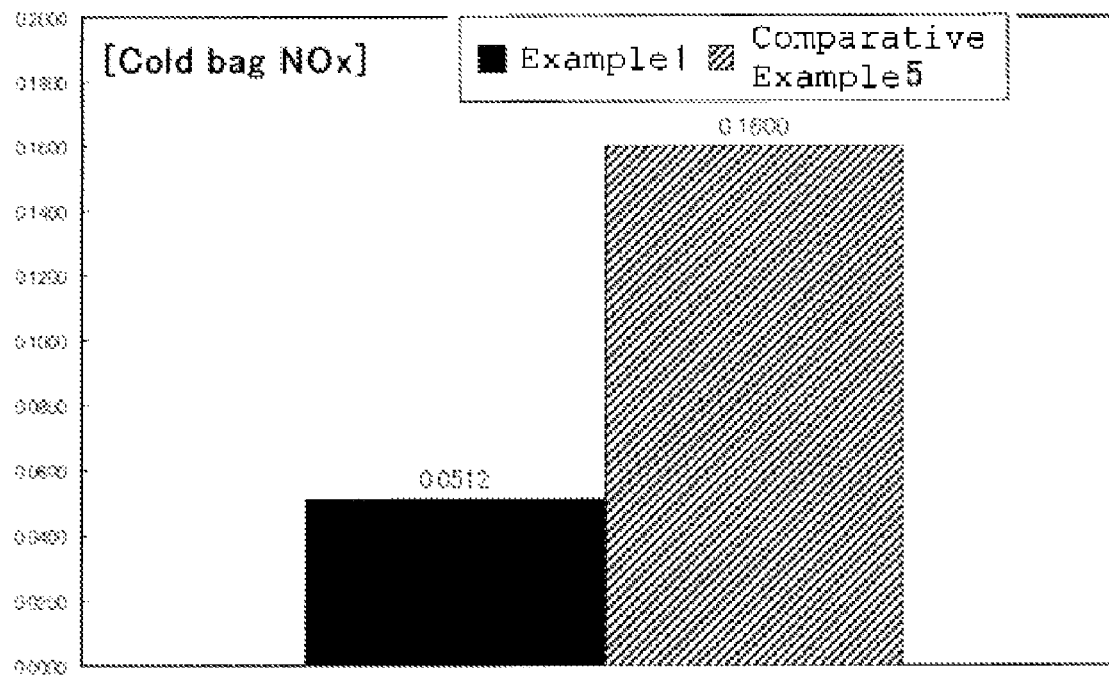
FIG. 11 is a graph of measurement of quantity of $NO_x$ components in a "Cold Bag" of an exhaust gas purification apparatus in Example 1 and Comparative Example 5.
Figure 12:
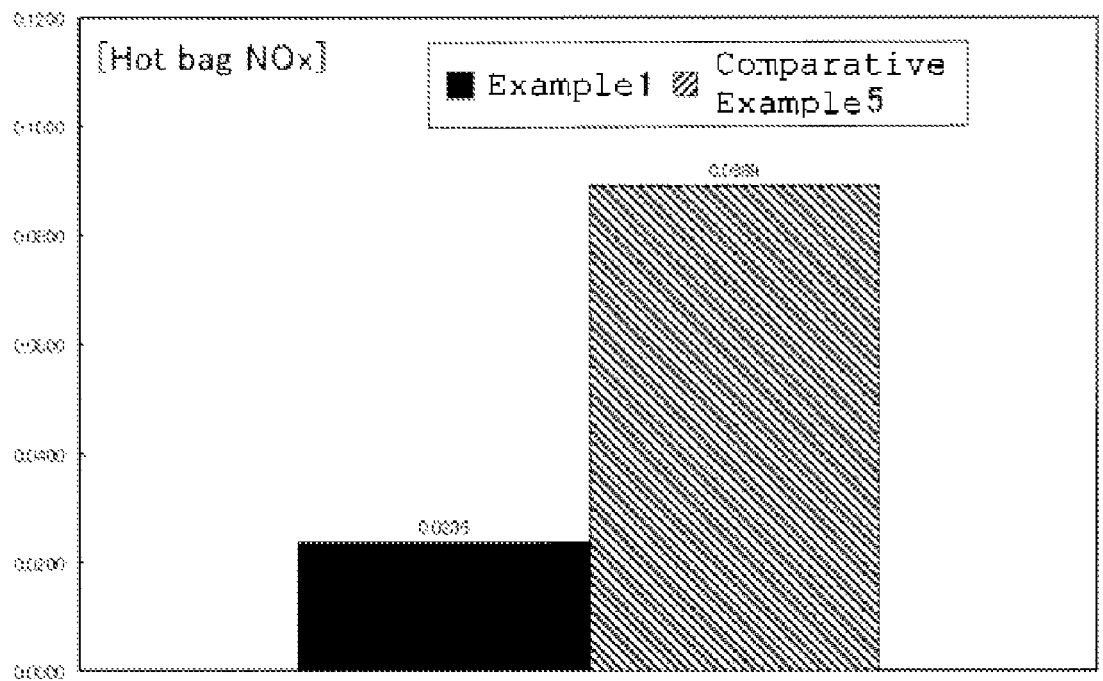
FIG. 12 is a graph of measurement of quantity of $NO_x$ components in a "Hot Bag" of an exhaust gas purification apparatus in Example 1 and Comparative Example 5.
Figure 13:
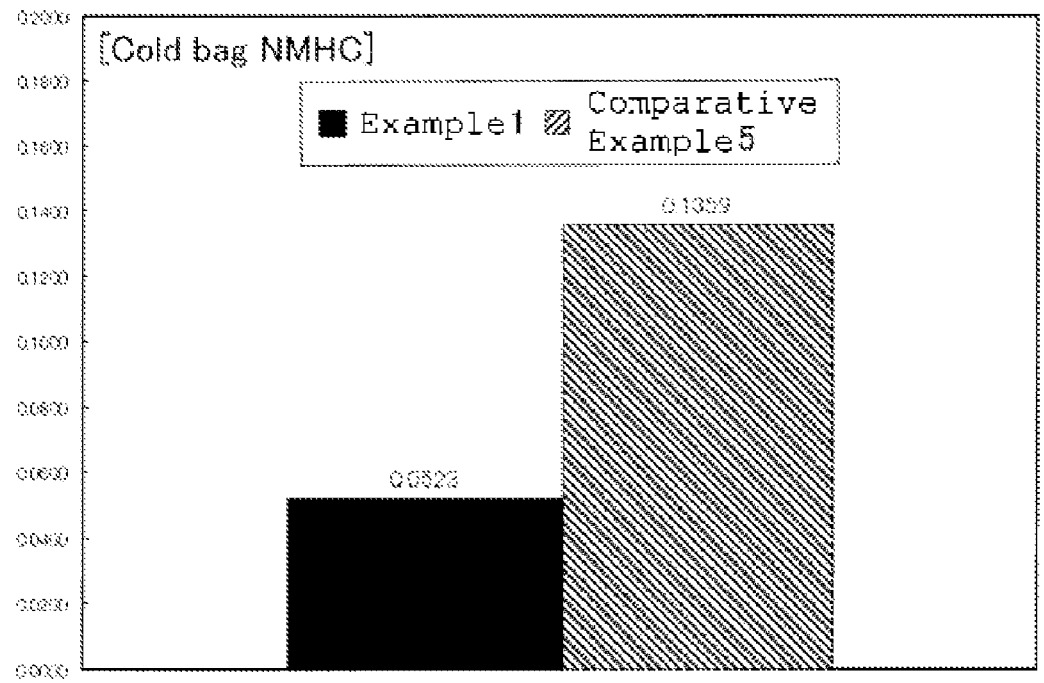
FIG. 13 is a graph of measurement of quantity of NMHC (non-methane hydrocarbons) components in a "Cold Bag" of an exhaust gas purification apparatus in Example 1 and Comparative Example 5.
Figure 14:
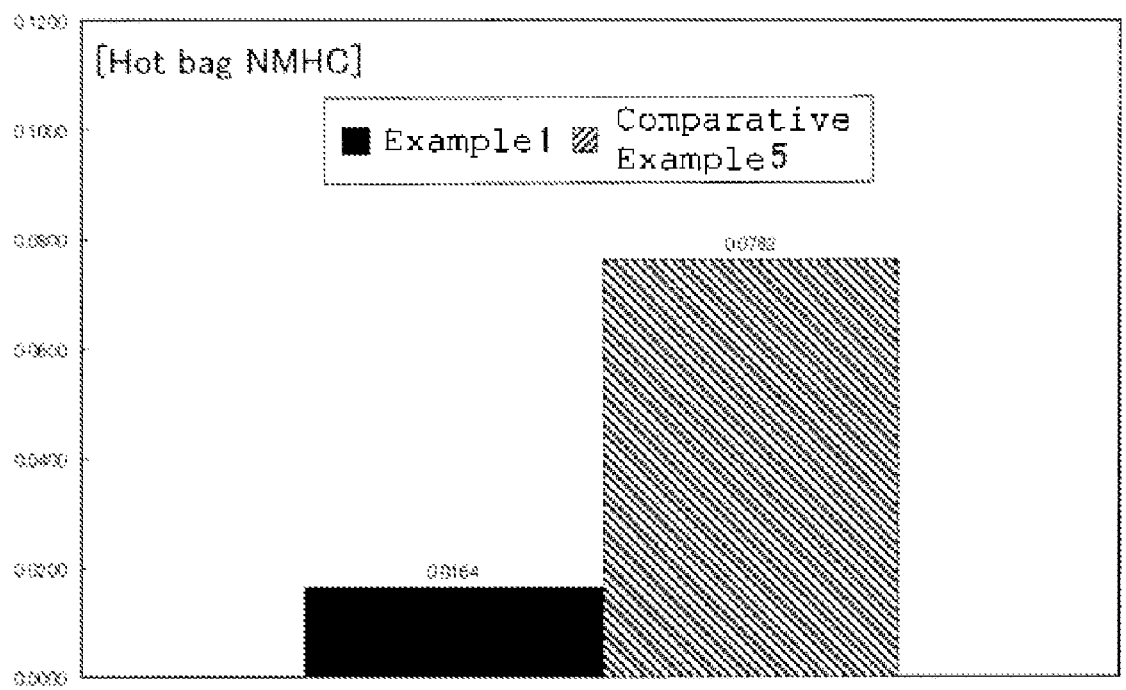
FIG. 14 is a graph of measurement of quantity of NMHC (non-methane hydrocarbons) components in a "Hot Bag" of an exhaust gas purification apparatus in Example 1 and Comparative Example 5.

When OSC performance of Ce.Zr (C') and Ce.Zr (C) is examined, results as shown in FIG. 2 were obtained. The Y axis represents oxygen quantity discharged from a sample, and the X axis represents passage of time. It should be noted that lean atmosphere is air, and rich atmosphere is gas containing 5% by mol concentration of hydrogen and the balance of helium, and hydrogen concentration is maintained at constant during measurement. Here, measurement was performed using a differential thermal balance, Thermo plus TG 8120, manufactured by RIGAKU Corp., under conditions of lean atmosphere: air, rich atmosphere:gas containing 5% H$_2$/He balance, temperature: 600° C., sample weight: 10 mg, and sample shape: powder.

As is understood from FIG. 2, in switching from lean atmosphere to rich atmosphere, Ce.Zr (C') discharges oxygen rapidly, while Ce.Zr (C) discharges oxygen mildly. In addition, Ce.Zr (C') discharges oxygen quickly and completely after switching to rich atmosphere, while Ce.Zr (C) continues to discharge oxygen for a long period of time, and discharge quantity of oxygen is also much.

It is considered that, in exhaust gas purification catalyst of the present invention using Ce.Zr (C) in the upper layer, purification performance of NO$_x$ was enhanced, by influence of difference of such OSC performance.

Content of the rhodium component in the upper layer is from 0.01 to 10 g/L, and preferably 0.1 to 5 g/L as converted to metal, per unit volume of the honeycomb type structure. In addition, content of Ce.Zr (C) is from 3 to 200 g/L, and preferably 5 to 100 g/L, based on unit volume of the honeycomb type structure.

[The Lower Layer]

In the lower layer of the exhaust gas purification catalyst of the present invention, the catalyst composition having the activated metal (A), the heat resistant inorganic oxide (B) and the cerium-containing oxide (C') having a cubic crystal and/or a tetragonal crystal as the major crystal structure, wherein the activated metal (A) is palladium, or palladium and platinum is used.

Because the Pd component, which is a catalyst metal specie exerting oxidation activity, is cheaper than Rh and Pt, it can be used in a relatively large quantity. Therefore, in the lower layer, all of the noble metal components or as a major component, the Pd component is used.

However, Pd is liable to decrease catalytic activity by poisoning by a sulfur component (JP-A-2005-021793, paragraph 0005). Therefore, in the case of using Pd, it is desirable that use amount thereof is increased or it is used in an internal combustion engine using fuel with low sulfur content. Reduction of sulfur content of fuel has been progressing in both of gasoline and light oil, however, in particular, gasoline. Therefore, it is preferable that a catalyst using the Pd component as a major catalyst metal specie as the present invention, is used in the TWC to be used in purification of exhaust gas from a gasoline engine.

In addition, the lower layer of the exhaust gas purification catalyst of the present invention is one not substantially containing the Rh component. Presence of a catalytically activated specie having oxidizing activity, such as the Pd component or the Pt component, and the Rh component having reducing activity, in the same layer may set off mutual activity, in some cases (JP-A-11-169712, paragraph 0011). In addition, Pd or Pt is a metal having worry of making an alloy with Rh, or sintering, and may decrease activity by sintering (JP-A-2005-021793, paragraph 0005; JP-A-2002-326033, paragraph 0004). Therefore, it is made that the Pd component or the Pt component is not present in the same catalyst layer as the Rh component.

And, in purification of exhaust gas from a gasoline engine, by using Pd as a major catalytically activated specie in the lower layer of the exhaust gas purification catalyst of the present invention, more excellent effect is exerted as compared with the case of using Pt only.

In addition, in the lower layer of the exhaust gas purification catalyst to be used in the present invention, Ce.Zr (C') is used. Reason for enhancing purification performance of $NO_x$ by using Ce.Zr (C') in the lower layer, as compared with Ce.Zr (C), is not certain, however, it is considered that difference of OSC performance of both, described above, may have influence. That is, it is considered that in switching from lean atmosphere to rich atmosphere, Ce.Zr (C') discharges oxygen rapidly, and discharge smaller quantity of oxygen than Ce.Zr (C).

In addition, it is desirable that the Ba component, which is an alkaline earth metal component, is used in the lower layer (the Pd component layer, or the Pd and Pt component layer). The alkaline earth metal component is an $NO_x$ occlusion component, however, presence of the Rh component and the alkaline earth metal component in the same composition reduces purification performance of $NO_x$ (JP-A-2002-326033, paragraph 0013). Reason for reducing purification performance of $NO_x$ in this way is not certain, however, it is considered to be caused by interference of purification action of $NO_x$ by the Rh component, because the alkaline earth metal component has occlusion action of $NO_x$. Therefore the alkaline earth metal component is used in the lower layer, so that the alkaline earth metal component and the Rh component are contained in different catalyst composition layers.

Content of the barium component is from 0.1 to 50 g/L, and preferably from 1 to 30 g/L as converted to the oxide, per unit volume of the honeycomb type structure. The barium component exerts effect even in a small quantity, however, in the case where use amount thereof increases to the same mole number as Pd, or Pd and Pt, effect comparable to the use amount may not be desired in some cases.

[Preparation of a Catalyst]

A catalyst composition to be used in the exhaust gas purification catalyst of the present invention is not especially limited by a production method, and a known method can be used. As one example thereof, as raw materials of the Pd component, the Pt component and the Rh component of the catalyst metal components, the salt solutions of these nitrate salt, sulfate salt, carbonate salt, acetate salt and the like are prepared. These salt solutions are mixed into the heat resistant inorganic oxide, which is a base material. This mixture is dried, and a solvent is removed to obtain the heat resistant inorganic oxide base material supported a catalyst metal component. Here, after drying this mixture, a firing step may be added. It is desirable that the fired substance after passing the firing step is converted to powder by a method of crushing or the like.

In the case where a noble metal is specifically supported onto γ-alumina, zirconium oxide or the like, dinitrodiammine palladium, palladium nitrate, palladium chloride, chloroplatinic (IV) acid, diamineplatinum (II) nitrite, a solution of hydroxy-amine platinate; an aqueous solution of a meta salt such as chloroplatinic acid, rhodium (III) chloride, or rhodium (III) nitrate can be mixed with γ-alumina, zirconium oxide or the like, and dried and fired.

Next, by adding a medium such as water, the cerium-zirconium-type composite oxide (C), the cerium-containing oxide (C'), and if necessary, the Ba component and other catalyst component raw materials, into the heat resistant inorganic oxide base material, which is supported by a catalyst metal component, and via a crush-mixing step, catalyst composition slurry is obtained.

The Ba component is present as barium oxide in the honeycomb type structure-type catalyst in many cases, however, in producing catalyst composition slurry, it may be added in a form of other barium salt such as barium sulfate, barium carbonate or barium nitrate, or it may be a composite oxide containing barium oxide, barium sulfate, barium carbonate or barium nitrate. Among these, use of barium sulfate decreases viscosity of the catalyst composition slurry, and may enhance coating property in wash coat. The honeycomb type structure-type carrier has shape where a plurality of through holes is assembled, and thus makes it difficult for slurry with high viscosity to coat the catalyst composition slurry inside the through holes. The fact that use of barium sulfate decrease viscosity of the slurry means that the addition of not only the Ba component but also a large quantity of catalyst components is made easy, and makes easy to obtain the honeycomb type structure-type catalyst with high activity.

As the above "other catalyst components", the catalyst components themselves may be used, however, catalyst component raw materials, which will become catalyst components in the firing step of the later stage, may be used. In addition, in mixing the catalyst components with a medium such as water, a dispersing agent, a pH regulator or the like may be formulated. In addition, other than the catalyst components or co-catalyst components having specific function, inorganic oxides for a binder and the like may be mixed to make coating onto the honeycomb type structure firm.

The honeycomb type structure-type catalyst to be used in the present invention can be produced by coating the catalyst composition slurry for the lower layer and the catalyst composition slurry for the upper layer obtained by the above method sequentially onto the honeycomb type structure-type carrier, drying and firing.

A coating method onto the honeycomb type structure-type carrier is not especially limited, however, a wash coat method is preferable. In coating the catalyst composition onto two layers, the above coating step may be repeated as for each catalyst composition; or drying and firing may be performed after repeating the coating step as for each catalyst composition; or firing may be performed after performing the step to drying as for each catalyst composition. Drying temperature is preferably from 100 to 300° C., and more preferably from 100 to 200° C. In addition, firing temperature is preferably from 300 to 1200° C., and from 400 to 800° C., or from 400 to 600° C. is particularly preferable. As for a heating means, heating can be performed by a known heating means such as an electric furnace, a gas furnace.

In the present invention, only two layers may be coated directly onto the surface of the honeycomb type structure in this way, however, a coating layer may be provided separately at exhaust gas flow side at the upper side of the upper layer, between the upper layer and the lower layer, or the honeycomb type structure-type carrier side at the lower side of the lower layer. As the coating layer provided separately, there is included a base coat layer for enhancing adhesion between the lower layer and the honeycomb type structure; or a layer for suppressing transfer of the catalyst components between the upper layer and the lower layer; the most upper layer as a poisoning prevention layer of the upper layer; or the like.

2. The Exhaust Gas Purification Apparatus

The exhaust gas purification apparatus of the present invention is one where the above exhaust gas purification catalyst is arranged in a passage of exhaust gas discharged from a gasoline engine for an automobile. The exhaust gas purification catalyst of the present invention contains the Pd component or the Pd component the Pt component, as oxidation-type main activated metal species, or the Rh component, as a reduction-type activated metal specie, therefore it is used preferably as the TWC for purifying HC, CO and $NO_x$ contained in exhaust gas.

Conventionally, as a catalyst for purifying exhaust gas generated in use of fuel with high sulfur concentration, the Pt component having oxidation function has been used. Reason for that is because the catalyst components are poisoned by sulfur components and the like in exhaust gas generating derived from fuel, however, the Pt component can maintain activity even when poisoned by the sulfur components.

However, in recent years, decrease in sulfur-content in fuel has been progressed, in particular, decrease in sulfur-content in gasoline has been promoted, and in Japan, it is said desirable that quantity of sulfur component in fuel is equal to or lower than 50 ppm, and gasoline or light oil with a sulfur component of equal to or lower than 10 ppm is distributed as sulfur-free fuel.

In the case where such low sulfur fuel is used, a situation of serious activity decrease caused by sulfur poisoning of a catalyst does not generate, therefore, a catalyst containing the Pt component, which is resistant to sulfur poisoning, may not dare to be used to an exhaust gas purification apparatus for an internal combustion engine supplied with low sulfur-containing fuel.

Another reason is because it can be said that in exhaust gas not containing sulfur components or having extremely low sulfur concentration, the Pd component exerts excellent activity for purification of CO, HC and $NO_x$, as compared with the Pt component, and superiority of this Pd component is significant at the vicinity of theoretical air/fuel ratio (1989, published by Catalysis Society of Japan, Catalyst, vol. 31, No. 8, p 566-567), and only the Pd component is enough.

Therefore, in the case where the catalyst of the present invention is used as the TWC for a gasoline engine vehicle, even by using only the Pd component as the activated metal (A) of the lower layer, sufficient catalytic activity can be obtained, and cheap and high performance exhaust gas purification apparatus can be provided.

A gasoline engine for an automobile is operated in a state where fuel concentration of air-fuel mixture are repeated in a lean state and a rich state. The present exhaust gas purification catalyst exerts significant action effect of the exhaust gas purification apparatus according to the present invention, because it contains the cerium-zirconium-type composite oxide (C) containing the pyrochlore phase in the crystal structure in the upper layer; and the cerium-containing oxide (C') having a cubic crystal and/or a tetragonal crystal as a major crystal structure in the lower layer.

In the exhaust gas purification apparatus of the present invention, use of only one exhaust gas purification catalyst of the present invention may be enough. In the case where the two or more catalysts are used, the exhaust gas purification catalyst of the present invention may be arranged at any of the upstream side and the down-stream side of the exhaust gas passage.

In the exhaust gas purification catalyst for an automobile in recent years, use of two or more catalysts is general, however, in the present invention, it is not necessary to investigate a new catalyst layout, and it is applicable easily not only to a conventional automobile but also to an automobile to be commercialized in the future. In addition, at the later stage of the upstream side catalyst and the down-stream side catalyst, it can be used by changing a design as appropriate, such as combining catalysts having similar function, or completely different catalysts.

3. The Exhaust Gas Purification Method

The exhaust gas purification method of the present invention is a method for purifying hydrocarbons (HC), carbon monoxide (CO) and nitrogen oxides ($NO_x$), by using the above exhaust gas purification apparatus, and contacting the exhaust gas discharged from an internal combustion engine.

The exhaust gas purification method of the present invention is one where HC, CO and $NO_x$ are purified even by the above one exhaust gas purification catalyst, and in the case where two or more exhaust gas purification catalysts other than the exhaust gas purification catalyst of the present invention are used in combination, similar action effect can be obtained by using the exhaust gas purification catalyst of the present invention at any of the upstream side and the down-stream side.

The present applicants have proposed a catalyst system, which exerts excellent exhaust gas purification performance by arranging a catalyst containing the cerium-zirconium-type composite oxide (C) having the pyrochlore phase in the crystal structure, and arranging the TWC containing the known OSC at the upstream side (the Patent Literature 7). The present invention is not such a limited use method, and is one which can also be used as a catalyst at the upstream side.

Catalytic function can be expected even when temperature of exhaust gas is low, for example, room temperature, or high such as 700° C. Typically, usually, it is used at a temperature of from 700 to 800° C., and preferably from 100 to 600° C. Although a certain degree of difference arises in catalytic activity depending on exhaust gas temperature, catalytic function is exerted in such a wide temperature range.

The present invention is not limited to the TWC as described above, and is also applicable to HC-SCR (Selective Catalytic Reduction) or the like, where the HC is used as a reducing agent for purification of $NO_x$ in exhaust gas of a diesel engine. The HC-SCR is one for using the HC as a reducing agent for purifying $NO_x$ in exhaust gas from lean combustion, and the HC to be used on this occasion is one for increasing HC concentration in exhaust gas by temporarily decreasing air/fuel ratio of air mixed with fuel, which is supplied to a combustion room, or for supplying by directly spraying fuel into exhaust gas. In the HC-SCR, as major activated specie in the lower layer, not only a catalyst containing palladium but also a catalyst containing palladium and platinum can be used suitably.

It is preferable that the present invention is applied to a gasoline engine, however, it maybe applied also to an internal combustion engine for an automobile using fossil fuel such as diesel and LPG, or bio-diesel fuel, or a boiler, a gas turbine or the like.

EXAMPLES

Characteristics of the present invention will be made still more clearly below with reference to Examples and Comparative Examples. It should be noted that the present invention should not be limited to embodiment of these Examples. It should be noted that the cerium-zirconium-type composite oxide (C), (C'), which are catalyst components, and catalyst composition slurry containing them, were prepared by the methods shown below.

[The Cerium-Zirconium-Type Composite Oxide (C)]

By using high purity zirconium oxide (a purity of 99.9%) as a raw material of Zr, and high purity cerium oxide (a purity of 99.9%) as a raw material of Ce, powder of the cerium-zirconium-type composite oxide of the present invention was produced according to procedure shown next.

Firstly, in order to prepare 10 kg of the powder, the high purity zirconium oxide (4.2 kg) and the high purity cerium oxide (5.8 kg) were sampled and mixed, and subjected to melting at equal to or higher than 2250° C., using an arc-type electric furnace under condition of a secondary voltage of 85 V, an average load power of 99.5 kW, a welding time of 2 hours and applying a total electric energy of 182 kWh.

It should be noted that to promote initial stage energization, 500 g of coke was used. After completion of the melting, the electric furnace was covered with a carbon lid, and an ingot was obtained by gradual cooling for 24 hours in air atmosphere. The resulting ingot was crushed with a jaw crusher or a roll crusher, down to a size of 3 mm, and then powder with a size of equal to or smaller than 1 mm was collected using a sieve to obtain the present cerium-zirconium-type composite oxide.

Next, in order to remove a suboxide in the melting step or a strain inside crystal due to super-cooling, it was subjected to firing at 800° C. for 3 hours in air atmosphere, using the electric furnace, and crushing with a planet mill for 10 minutes to obtain powder, Ce.Zr (C), with an average particle size of 1.3 µm. The average particle size was analyzed with a laser diffraction scattering apparatus (LS230, manufactured by COULTER Co., Ltd.). By this analysis with XRD, it was confirmed that a pyrochlore phase is contained singly in the crystal structure. In addition, specific surface area was 1.3 $m^2/g$.

When this Ce.Zr(C) was fired in high temperature atmosphere at 1050° C., crystallite size was 71.5 nm, and after firing in high temperature atmosphere at 1150° C., crystallite size was 72.1 nm. This average crystallite size was calculated, as described above, from Scherrer equation and an XRD profile (half bandwidth). In addition, as for Ce.Zr(C) fired in high temperature atmosphere at 1050° C., and fired in high temperature atmosphere at 1150° C., main peaks by XRD measurement nearly overlapped, as shown in FIG. 1(A).

[The Cerium-Zirconium-Type Composite Oxide (C')]

Commercially available cerium nitrate (a purity of 99.0%) and zirconium oxynitrate (a purity of 99.0%) were dissolved in ion-exchanged water to prepare an aqueous solution of 20% by weight as converted to $CeO_2$ and 25% by weight as converted to $ZrO_2$.

Then, each of the nitrate solutions required to prepare a composite oxide composed of 58% by weight of $CeO_2$ and 42% by weight of $ZrO_2$, was mixed, and 5% ammonia water was added to make pH=10.2 finally, and cerium hydroxide and zirconium hydroxide were co-precipitated.

Then, after performing suction filtration, it was washed with pure water. This was fired at 500° C. for 2 hours to obtain the cerium-zirconium-type composite oxide. Subsequently, via similar steps as in the production of the above Ce.Zr(C), a non-melt-type cerium-zirconium-type composite oxide, Ce.Zr(C'), with a particle size of equal to or smaller than 2.0 µm, was obtained. This was confirmed with XRD to contain a tetragonal structure singly in the crystal structure. In addition, specific surface area was 74 $m^2/g$.

When this Ce.Zr(C') was fired in high temperature atmosphere at 1050° C., crystallite size was 16.5 nm, and after firing in high temperature atmosphere at 1150° C., crystallite size was 35.4 nm. This average crystallite size was calculated, as described above, from Scherrer equation and an XRD profile (half bandwidth). Crystallite size changed two times or more, at 1050° C. and 1150° C. In addition, as for Ce.Zr(C') fired in high temperature atmosphere at 1050° C., and as for Ce.Zr(C') fired in high temperature atmosphere at 1150° C., main peaks by XRD measurement did not overlap, as shown in FIG. 1(B).

[Catalyst Composition Slurry-1]

By preparing the following raw materials such as the above Ce.Zr(C), catalyst composition slurry-1 was produced. Mixing of slurry was performed by crush mixing with a ball mill.

=Raw Materials of Catalyst Composition Slurry-1=

An aqueous solution of rhodium nitrate (metal conversion: 7 wt %:)

$ZrO_2$ (specific surface area value: 60 $m^2/g$)

Ce.Zr(C) (average particle size: 1.3 µm, specific surface area: 1.3 $m^2/g$)

γ-alumina (specific surface area value: 220 $m^2/g$)

Water

Rh was supported by impregnating an aqueous solution of rhodium nitrate onto $ZrO_2$ by an impregnation method. After drying this, it was fired at 300° C. for 1 hour to obtain Rh supported $ZrO_2$ (hereafter may be referred to as Rh/[$ZrO_2$]).

Rh/[$ZrO_2$] obtained in this way, Ce.Zr(C), γ-alumina as a binder and water were crush-mixed using a ball mill to obtain catalyst composition slurry-1.

[Catalyst Composition Slurry-2]

By preparing the following raw materials such as the above Ce.Zr(C'), catalyst composition slurry-2 was produced. Mixing of slurry was performed by crush mixing with a ball mill.

=Raw Materials of Catalyst Composition Slurry-2=

An aqueous solution of rhodium nitrate (metal conversion: 20 wt %:)

γ-alumina (specific surface area value: 220 $m^2/g$)

Ce.Zr(C') (average particle size: 2.0 µm, specific surface area: 74 $m^2/g$)

Barium hydroxide (Ba(OH)$_2$)

Water

Pd was supported by impregnating an aqueous solution of a Pd salt onto γ-alumina. After drying this, it was fired at 300° C. for 1 hour to obtain Pd supported γ-alumina (hereafter may be referred to as Pd/[γ-alumina]).

Pd/[γ-alumina] obtained in this way, Ce.Zr(C'), Ba(OH)$_2$, water and γ-alumina as a binder were crush-mixed using a ball mill to obtain catalyst composition slurry-2.

[Catalyst Composition Slurry-3]

Catalyst composition slurry-3 was obtained similarly to the catalyst composition slurry-2, except that barium hydroxide was removed from the catalyst composition slurry-2, and quantity of γ-alumina as a binder was increased, by quantity equivalent to quantity of barium hydroxide removed.

[Catalyst Composition Slurry-4]

Catalyst composition slurry-4 was obtained similarly to the catalyst composition slurry-1, except that Ce.Zr(C) of the catalyst composition slurry-1 was changed to Ce.Zr(C').

[Catalyst Composition Slurry-5]

Catalyst composition slurry-5 was obtained similarly to the catalyst composition slurry-2, except that Ce.Zr(C') of the catalyst composition slurry-2 was changed to Ce.Zr(C).

[Catalyst Composition Slurry-6]

Catalyst composition slurry-6 was obtained similarly to the catalyst composition slurry-5, except that the barium component was removed from the catalyst composition slurry-5, and γ-alumina was added, as substitution for the barium component removed.

[Catalyst Composition Slurry-7]

Catalyst composition slurry-7 was obtained similarly to the catalyst composition slurry-2, except that the aqueous solution of palladium nitrate (metal conversion: 20% by weight) was changed to an aqueous solution of diammine nitrite platinum (II) (metal conversion: 20% by weight).

Example 1 and Comparative Examples 1 and 2

By laminating the above catalyst composition slurry-1 and 2 onto the following honeycomb type structure by a wash coat method, and after drying and firing under the following condition, by heating under the following condition, a honeycomb type structure-type catalyst of the present invention (Example 1) with enhanced durability was obtained.

In addition, similarly, by using catalyst composition slurry-4 and 2, or catalyst composition slurry-1 and 5, honeycomb type structure-type catalysts for comparison (Comparative Examples 1 and 2) were obtained.

Layer configurations in each honeycomb type structure-type catalyst, and compositions of each component are shown in Table 1. Numbers in parentheses in Table 1 represent quantity of component per unit volume [g/L] of each catalyst component, and quantities of the Pd component and the Rh component are metal converted values.

=The Honeycomb Type Structure=
  Material: made of cordierite
  Size: 118.4φ×50 [mm] (volume: 550 cc)
  Cell density: 900 cell/inch$^2$
  Thickness of cell wall: 2.5 mil
=Drying and Firing Conditions=
  Drying temperature: 150° C.
  Firing furnace: A gas furnace
  Firing temperature: 500° C.
  Firing time: 2 hours
=Durability Conditions (Catalyst Aging Conditions)=
  Catalyst aging: Stoichio-fuel cut type aging pattern (an engine in the following "Measurement conditions" was used)
  Temperature: 950° C.
  Aging time: 40 hours

TABLE 1

| | | Composition of components |
|---|---|---|
| Example 1 | Upper layer | Catalyst composition slurry-1 Rh(0.25)/[ZrO$_2$(70)], Ce—Zr(C) (10), γ-alumina (25) |
| | Lower layer | Catalyst composition slurry-2 Pd(6.25)/[γ-alumina (75)], Ce—Zr(C') (20), Ba(OH)$_2$ (10), γ-alumina (15) |
| Comparative Example 1 | Upper layer | Catalyst composition slurry-4 Rh(0.25)/[ZrO$_2$(70)], Ce—Zr(C') (10), γ-alumina (25) |
| | Lower layer | Catalyst composition slurry-2 Pd(6.25)/[γ-alumina (75)], Ce—Zr(C') (20), Ba(OH)$_2$ (10), γ-alumina (15) |

TABLE 1-continued

| | | Composition of components |
|---|---|---|
| Comparative Example 2 | Upper layer | Catalyst composition slurry-1 Rh(0.25)/[ZrO$_2$(70)], Ce—Zr(C) (10), γ-alumina (25) |
| | Lower layer | Catalyst composition slurry-5 Pd(6.25)/[γ-alumina (75)], Ce—Zr(C) (20), Ba(OH)$_2$ (10), γ-alumina (15) |

Then, in order to compare purification performance of catalysts as for Example 1, Comparative Example 1 and Comparative Example 2, discharged quantities of NMHC (non-methane hydrocarbons) and NO$_x$ contained in exhaust gas after passing through each catalyst were measured. Measurement conditions were in accordance with the following conditions. Results obtained are shown in FIGS. 3 to 6. In these Figs., numerical values in the Y-axis represent [g/km], showing discharged quantities of NMHC and NO$_x$ per running distance. They are the same also in the subsequent FIGS. 7 to 14.

[Measurement Conditions]
  An engine for evaluation: NA2.4 L, a gasoline engine
  Fuel: Commercially available regular gasoline (sulfur content: 10 ppm)
  Measurement mode: JC08 mode, hot and cold
  Measurement apparatus of exhaust gas: MEXA9400, manufactured by HORIBA Ltd.

The JC08 mode has contents nearer to practical running as compared with the conventional 10.15 mode, and similarly to the U.S. FTP mode, is a kind of a practical "transient mode", where acceleration and deceleration is also not constant, and is varied delicately. In addition, the test is performed in both of a state that an engine was warmed in advance (a hot phase), and a state that an engine is completely cold (a cold phase).

Among these, exhaust gas sampled in the cold phase is called "Cold Bag", and exhaust gas sampled in the hot phase is called "Hot Bag". "Cold Bag" and "Hot Bag" are adopted widely, in general, in evaluation of the exhaust gas purification apparatus, and also in the present invention, quantities of NMHC (non-methane hydrocarbons) components and NO$_x$ components in the "Cold Bag" and the "Hot Bag" were measured. NMHC is a general name of hydrocarbons (aliphatic saturated hydrocarbons, aliphatic unsaturated hydrocarbons, and aromatic hydrocarbons) other than methane, and is specified as an emission regulated substance in exhaust gas from an automobile, as a causative substance of a photochemical oxidant.

Example 2 and Comparative Examples 3 and 4

By laminating the above catalyst composition slurry-1 and 3 onto the above honeycomb type structure by a wash coat method, and by heating after drying and firing under the same condition as in Example 1, a honeycomb type structure-type catalyst of the present invention (Example 2) with enhanced durability was obtained.

In addition, similarly, by using the catalyst composition slurry-4 and 3, or the catalyst composition slurry-1 and 6, honeycomb type structure-type catalysts (Comparative Examples 3 and 4) for comparison were obtained. They are the honeycomb type structure-type catalysts where the Ba component was removed from the lower layer containing the Pd component of the above catalyst.

Layer configurations in each honeycomb type structure-type catalyst, and compositions of each component are shown in Table 2. Numbers in parentheses in Table 2 represent quantity of component per unit volume [g/L] of each catalyst component, and quantities of the Pd component and the Rh component are metal converted values.

Also as for these, purification performance thereof was compared. Measurement conditions are similar to those in Example 1, Comparative Example 1 and Comparative Example 2. Results are shown in FIGS. 7 to 10.

TABLE 2

| | | Composition of components |
|---|---|---|
| Example 2 | Upper layer | Catalyst composition slurry-1 Rh(0.25)/[ZrO$_2$(70)], Ce—Zr(C) (10), γ-alumina (25) |
| | Lower layer | Catalyst composition slurry-3 Pd(6.25)/[γ-alumina (75)], Ce—Zr(C') (20), γ-alumina (25) |
| Comparative Example 3 | Upper layer | Catalyst composition slurry-4 Rh(0.25)/[ZrO$_2$(70)], Ce—Zr(C') (10), γ-alumina (25) |
| | Lower layer | Catalyst composition slurry-3 Pd(6.25)/[γ-alumina (75)], Ce—Zr(C') (20), γ-alumina (25) |
| Comparative Example 4 | Upper layer | Catalyst composition slurry-1 Rh(0.25)/[ZrO$_2$(70)], Ce—Zr(C) (10), γ-alumina (25) |
| | Lower layer | Catalyst composition slurry-6 Pd(6.25)/[γ-alumina (75)], Ce—Zr(C) (20), γ-alumina (15) |

Comparative Example 5

By laminating the catalyst composition slurry-1 and 7 onto the above honeycomb type structure by a wash coat method, and by heating after drying and firing under the same condition as in Example 1, a honeycomb type structure-type catalyst (Comparative Example 5) of Comparative Example of the present invention with enhanced durability was obtained. Comparative Example 5 is one where the Pd component in the lower layer in Example 1 was changed to the Pt component.

Layer configurations in each honeycomb type structure-type catalyst, and compositions of each component of Comparative Example 5 are shown in Table 3. Numbers in parentheses in Table 3 represent quantity of component per unit volume [g/L] of each catalyst component, and quantities of the Pt component and the Rh component are metal converted values.

Also as for these, purification performance thereof was compared. Measurement conditions are similar to those in Example 1, Comparative Example 1 and Comparative Example 2. Results are shown in FIGS. 11 to 14, in comparison with Example 1.

TABLE 3

| | | Composition of components |
|---|---|---|
| Example 1 | Upper layer | Catalyst composition slurry-1 Rh(0.25)/[ZrO$_2$(70)], Ce—Zr(C) (10), γ-alumina (25) |
| | Lower layer | Catalyst composition slurry-2 Pd(6.25)/[γ-alumina (75)], Ce—Zr(C') (20), Ba(OH)$_2$ (10), γ-alumina (15) |
| Comparative Example 5 | Upper layer | Catalyst composition slurry-1 Rh(0.25)/[ZrO$_2$(70)], Ce—Zr(C) (10), γ-alumina (25) |
| | Lower layer | Catalyst composition slurry-7 Pt(6.25)/[γ-alumina (75)], Ce—Zr(C') (20), Ba(OH)$_2$ (10), γ-alumina (15) |

[Evaluation]

From the above results, it is understood that in Examples 1 and 2, where a specific catalyst composition having a layer configuration of the present invention was used, purification performance of NO$_x$ varies depending on presence or absence of the Ba component, to exhaust gas from a gasoline engine, however, as shown in FIGS. 3 to 11, excellent purification performance of NMHC and NO$_x$ is exerted irrespective of at high temperature and at low temperature. In particular, by using the Pd component in the lower catalyst layer of the present invention, excellent purification performance of exhaust gas is exerted.

On the contrary, in Comparative Examples 1 to 5, because of having a layer configuration using a catalyst composition different from the present invention, desired purification performance of NMHC and NO$_x$ is not obtained. Comparative Example 5, where the Pt component was used in the lower catalyst layer of the present invention, also showed similar result. It should be noted that effect comparable to Examples 1 and 2 has been confirmed, in the HC-SCR which treats exhaust gas from a diesel engine.

Industrial Applicability

Since the exhaust gas purification catalyst of the present invention is capable of purifying HC, CO and NO$_x$, which are harmful components in exhaust gas, under environment where exhaust gas temperature varies from low temperature to high temperature, can be used as various exhaust gas purification apparatuses for an internal combustion engine for an automobile using fossil fuel such as gasoline, diesel, LPG, or bio-diesel fuel, or a boiler, a gas turbine or the like.

In particular, the exhaust gas purification catalyst of the present invention, when applied to the exhaust gas purification apparatus for an internal combustion engine of an automobile such as a gasoline engine or a diesel engine, can purify NO$_x$ in exhaust gas efficiently, and is useful as the TWC for purifying HC, CO and NO$_x$ at the same time, under environment where oxygen concentration and HC concentration vary.

The invention claimed is:

1. An exhaust gas purification catalyst, characterized in that a catalyst composition for purifying hydrocarbons (HC), carbon monoxide (CO) and nitrogen oxides (NO$_x$) contained in exhaust gas is coated onto a honeycomb type structure with at least the upper and lower two layers as follows:

<The Upper Layer>
  A catalyst composition comprising an activated metal (A), a heat resistant inorganic oxide (B) and a cerium-zirconium-type composite oxide (C) containing a pyrochlore phase in a crystal structure, wherein the activated metal (A) is rhodium;

<The Lower Layer>
  A catalyst composition comprising an activated metal (A), a heat resistant inorganic oxide (B) and a cerium-containing oxide (C') having a cubic crystal and/or a tetragonal crystal as a major crystal structure, wherein the activated metal (A) is palladium, or palladium and platinum.

2. The exhaust gas purification catalyst according to claim 1, characterized in that the activated metal (A) of the lower layer is palladium.

3. The exhaust gas purification catalyst according to claim 1, characterized in that content of the activated metal (A) is from 0.01 to 10 g/L in both of the upper layer and the lower layer, per unit volume of the honeycomb type structure.

4. The exhaust gas purification catalyst according to claim 1, characterized in that the heat resistant inorganic oxide (B) is at least one kind selected from alumina, zirconia, silica, titania, silica-alumina, or zeolite.

5. The exhaust gas purification catalyst according to claim 1, characterized in that the heat resistant inorganic oxide (B) comprises zirconia as a main component in the upper layer, and on the other hand, alumina as a main component in the lower layer.

6. The exhaust gas purification catalyst according to claim 1, characterized in that the cerium-zirconium-type composite oxide (C) is obtained by crushing an ingot, which is melted a raw material mixture under heating at temperature of equal to or higher than melting point thereof, and then is formed by cooling, and when an average particle size is from 1 to 100 μm, specific surface area thereof is equal to or smaller than 20 $m^2/g$.

7. The exhaust gas purification catalyst according to claim 6, characterized in that the cerium-zirconium-type composite oxide (C) is still more crushed, and the average particle size is from 0.3 to 2 μm.

8. The exhaust gas purification catalyst according to claim 1, characterized in that cerium and zirconium of the cerium-zirconium-type composite oxide (C) are contained in a ratio of $CeO_2/ZrO_2=1/9$ to $9/1$, based on molar ratio as converted to an oxide.

9. The exhaust gas purification catalyst according to claim 1, characterized in that content of the cerium-zirconium-type composite oxide (C) is from 3 to 200 g/L, per unit volume of the honeycomb type structure.

10. The exhaust gas purification catalyst according to claim 1, characterized in that the cerium-containing oxide (C') is obtained by firing a raw material mixture under heating at temperature of below melting point thereof, and then by cooling and crushing, and when an average particle size is from 1 to 100 μm, specific surface area value thereof is from 10 to 300 $m^2/g$.

11. The exhaust gas purification catalyst according to claim 1, characterized in that content of the cerium-containing oxide (C') is from 5 to 200 g/L, per unit volume of the honeycomb type structure.

12. The exhaust gas purification catalyst according to claim 1, characterized in that a barium component is still more contained in the catalyst composition of the lower layer, and content thereof is from 1 to 30 g/L as converted to an oxide.

13. The exhaust gas purification catalyst according to claim 1, characterized in that the honeycomb type structure is a flow-through-type carrier with a cell density of from 10 to 1500 $cell/inch^2$.

14. An exhaust gas purification apparatus comprising by arranging the catalyst according to claim 1, in a passage of exhaust gas discharged from an internal combustion engine.

15. The exhaust gas purification apparatus according to claim 14, characterized in that the internal combustion engine is a gasoline engine.

16. An exhaust gas purification method, characterized in that hydrocarbons (HC), carbon monoxide (CO) and nitrogen oxides ($NO_x$) contained in exhaust gas are purified by contacting an exhaust gas discharged from an internal combustion engine to the exhaust gas purification apparatus according to claim 15.

* * * * *